United States Patent
Chen et al.

(10) Patent No.: US 8,203,338 B2
(45) Date of Patent: Jun. 19, 2012

(54) LINEAR STRUCTURE VERIFICATION IN MEDICAL APPLICATIONS

(75) Inventors: Shoupu Chen, Rochester, NY (US); Lawrence Allen Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1115 days.

(21) Appl. No.: 12/058,803

(22) Filed: Mar. 31, 2008

(65) Prior Publication Data

US 2009/0041327 A1 Feb. 12, 2009

Related U.S. Application Data

(60) Provisional application No. 60/954,153, filed on Aug. 6, 2007.

(51) Int. Cl.
*G01V 3/00* (2006.01)
(52) U.S. Cl. .......................... 324/307; 324/309
(58) Field of Classification Search .......... 324/300–322; 600/407–445; 382/128, 132, 225, 260, 261, 382/270, 272
See application file for complete search history.

(56) References Cited

U.S. PATENT DOCUMENTS

| | | | |
|---|---|---|---|
| 5,987,094 A * | 11/1999 | Clarke et al. ............... | 378/62 |
| 6,137,898 A | 10/2000 | Broussard et al. | |
| 6,748,044 B2 | 6/2004 | Sabol et al. | |
| 6,819,790 B2 | 11/2004 | Suzuki et al. | |
| 7,181,056 B2 * | 2/2007 | Campanini et al. .......... | 382/132 |
| 7,308,126 B2 | 12/2007 | Rogers et al. | |
| 7,593,561 B2 * | 9/2009 | Zhang et al. ................ | 382/130 |
| 7,664,604 B1 * | 2/2010 | Heine et al. ................. | 702/19 |
| 7,783,089 B2 | 8/2010 | Kaufhold et al. | |
| 7,899,228 B2 * | 3/2011 | Chen et al. ................... | 382/128 |
| 2002/0159622 A1 | 10/2002 | Schneider et al. | |
| 2008/0043036 A1 * | 2/2008 | Evertsz et al. ............... | 345/629 |
| 2009/0041326 A1 | 2/2009 | Chen et al. | |
| 2009/0041327 A1 * | 2/2009 | Chen et al. .................. | 382/132 |
| 2009/0180674 A1 * | 7/2009 | Chen et al. .................. | 382/128 |
| 2010/0104155 A1 * | 4/2010 | Chen et al. .................. | 382/128 |
| 2010/0246884 A1 * | 9/2010 | Chen et al. .................. | 382/103 |
| 2011/0142323 A1 * | 6/2011 | Chen et al. .................. | 382/132 |
| 2011/0176710 A1 * | 7/2011 | Mattiuzzi et al. ............ | 382/128 |

OTHER PUBLICATIONS

Marin Fischler, et al, "Random Sample Consensus: A Paradigm for Model Fitting with Applications to Image Analysis and Automated Cartography", Graphics and Image Processing, *Commun. ACM*, vol. 24, No. 6, Jun. 1981, pp. 381-395.

R. Kimmel et al., "On Edge Detection, Edge Integration and Geometric Active Contours," Proceedings of Int. Symposium on Mathematical Morphology, ISMM2002, Sydney, New South Wales, Australia, Apr. 2002, pp. 37-45.

Michal Holtzman-Gazit et al., "Segmentation of Thin Structures in Volumetric Medical Images," IEEE Trans Image Process, Feb. 2006, 15(2).

Stelios Halkiotis et al., Automatic detection of clustered microcalcifications in digital mammograms using mathematical morphology and neural networks, Signal Processing 87 (2007), pp. 1559-1568.

(Continued)

Primary Examiner — Brij Shrivastav

(57) ABSTRACT

A method is disclosed for verifying linear structures in a digital mammographic image, comprising providing a configurable linear structure verifier in mammography computer assisted diagnosis system; optionally using an microcalcification candidate cluster driven linear structure verification methodology; selecting parameters for the linear structure verifier from a plurality of different parameter generating sources, at least one of which is controllable by human input; configuring the verifier according to selected parameters; and verifying linear structure using cascade rules.

19 Claims, 18 Drawing Sheets

OTHER PUBLICATIONS

Reyer Zwiggelaar et al., Finding oriented line patterns in digital mammographic images, Wolfson Image Analysis Unit, Department of Medical Biophysics, University of Manchester M13 9PT, UK, pp. 59-68 (2007).

Nick Cerneaz et al., Finding curvilinear structures in mammograms, University of Oxford, Oxford OX1 3PJ, U.K., pp. 372-382, (2004).

Lionel C.C. Wai et al, A Multi-resolution CLS detection algorithm for mammographic image analysis, MICCAI2004, LNCS 3217, pp. 865-872, 2004.

L. Zhang et al., A new false positive reduction method for MCCs detection in digital mammography, Department of Electrical Engineering, Univ. of South Florida, Tampa FL, pp. 65-72, (2005).

\* cited by examiner

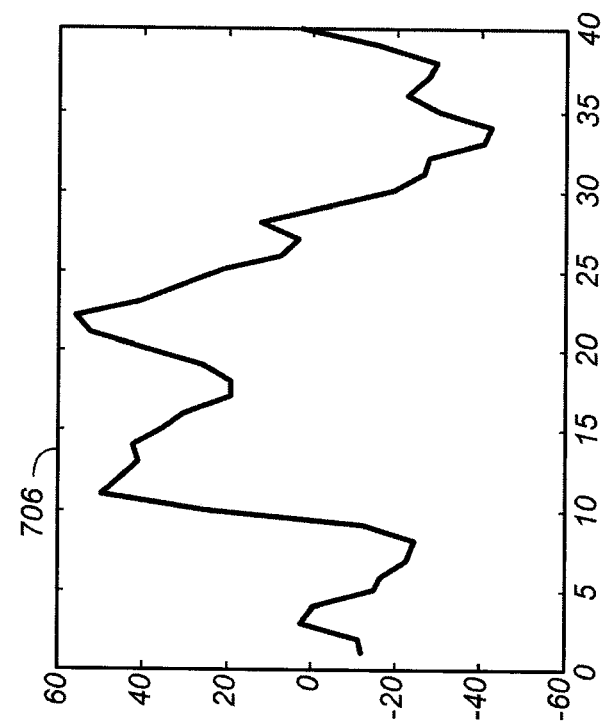
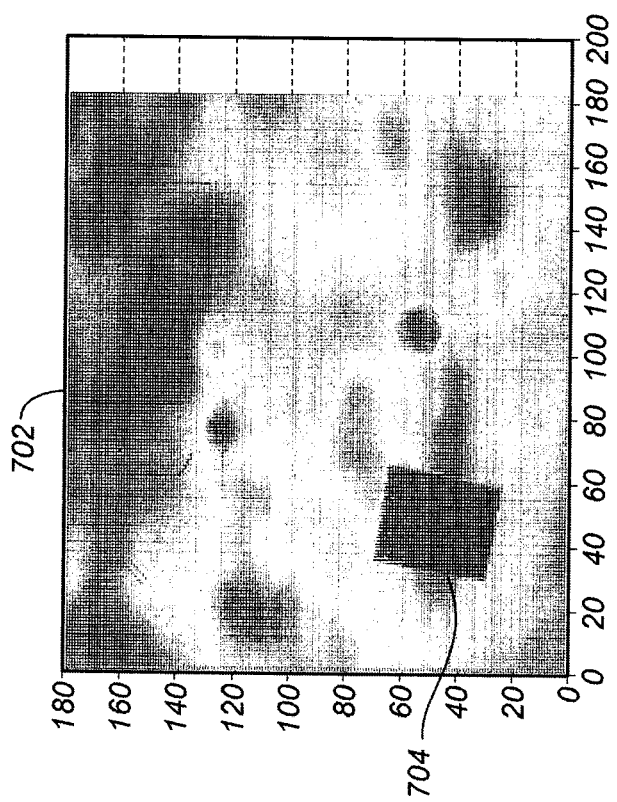
FIG. 7B
FIG. 7A

LINEAR STRUCTURE VERIFICATION IN MEDICAL APPLICATIONS

CROSS REFERENCE TO RELATED APPLICATION

Priority is claimed from related to U.S. Provisional Patent Application Ser. No. 60/954,153 filed Aug. 6, 2007 by Shoupu Chen and Lawrence Ray, entitled LINEAR STRUCTURE VERIFICATION IN MEDICAL APPLICATIONS.

FIELD OF THE INVENTION

The invention relates generally to image processing in medical applications, and in particular, to mammography CAD.

BACKGROUND OF THE INVENTION

Mammography is an effective method of screening for breast cancer, a leading cause of mortality among women. However, analyzing mammograms requires skilled radiologists whose performance can be degraded by the demand of viewing a large number of images in a finite amount of time. The computer-aided detection (CAD) feature in many mammography systems has been provided to assist radiologists in capturing true-positives (TP) that might otherwise have been overlooked.

An abnormality in mammograms includes microcalcifications (MCC), which are tiny deposits of calcium in breast carcinoma. It is very difficult to distinguish between malignant and benign microcalcification clusters, even for experienced radiologists, which may lead to a high rate of unnecessary biopsies. Therefore, it is desirable to design the CAD algorithm in such a way that a high TP rate can be achieved while the number of false-positives (FPs) is kept to a minimum. It has been noted that many FP MCC candidates as selected by mammography CAD systems in the past were found to fall on the linear normal structures such as blood vessels in digital or film-based mammograms. Thus, it is believed that removing those MCC candidates that are associated with linear structures will significantly reduce the overall FP rate.

Various methods for extracting linear structures from a mammographic image have been proposed. Zwiggelaar, Parr, and Taylor (R. Zwiggelaar, T. C. Parr, and C. J. Taylor, "Finding orientated line patterns in digital mammographic images," *Proc. 7th Br. Machine Vision Conf.,* 1996, pp. 715-724.) have compared the performance of several different approaches (including orientated bin and line operator methods) to the detection of linear structures with synthetic mammographic images. Their results suggest significant differences between the different approaches. One approach has been implemented as a multi-scale line operator and gives intuitively convincing results. The output could be used for classifying linear structures.

The work of line operator can be described as follow: The line operator takes the average grey level of the pixels lying on an orientated local line passing through the target pixel and subtracts the average intensity of all the pixels in the locally orientated neighborhood. The line strength is compared for n orientations. Line direction is obtained from the orientation producing the maximum line strength. Scale information can be obtained by applying the line operator to images that are resealed by Gaussian smoothing and sub-sampling. For each pixel, the scale producing the maximum line strength is taken as the detected line scale.

Cerneaz et al. (N. Cerneaz and M. Brady, "Finding Curvilinear Structures in Mammograms," *Lecture Notes in Computer Science,* 905, pp. 372-382, 1995) introduced a method that estimates the intensity profile of the curvilinear structures (CLS) in mammograms in a single scale. In this method, the CLS are assumed to have circular cross section when the breast is not compressed. And the cross section of CLS in mammogram is assumed to be elliptical. Candidate pixels for CLS are detected using the response of a second order difference operation which is applied in four directions. If there is a sufficient high response for one of the orientations the pixel will form part of a CLS. A measure of line strength is obtained by determining the contrast of the line profile at these pixels.

Wai et al. (A Multi-resolution CLS Detection Algorithm for Mammographic Image Analysis," *Medical Imaging Computing and Computer-Assisted Intervention, MICCAU,* pp. 865-872, 2004) adopted the two-step method from Cerneaz's work and devised a multi-resolution ridge detector for structures ranging from 1800 microns to 180 microns. Wai et al. also enhanced the performance of the detector by using a local energy thresholding to suppress undesirable response from noise. The local energy is also used to determine CLS junctions.

Alexander Schneider et al., in U.S. Patent Application Publication No. US20020159622, proposed a system and method for detecting lines in medical images. In their method, a direction image array and a line image array are formed by filtering a digital image with a single-peaked filter, convolving the regular array with second-order difference operators oriented along the horizontal, vertical, and diagonal axes, and computing the direction image arrays and line image arrays as direct scalar functions of the results of the second order difference operations. As best understood, line detection based on the use of four line operator functions requires fewer computations than line detection based on the use of three line operator functions, if the four line operator functions correspond to the special orientations of 0, 45, 90 and 135 degrees.

For the issue of FP reduction, a paper by Zhang et al. ("A New False Positive Reduction Method for MCCs Detection in Digital Mammography," *Acoustics, Speech and Signal Processing* 2001, *Proc. IEEE Intl. Conf. on* (ICASSP), V. 2, Issue 2001, pp. 1033-1036, 2001) describes a mixed feature multistage FP reduction algorithm utilizing eleven features extracted from spatial and morphology domains. These features include gray-level description, shape description and clusters description but no feature is directly related to linear structures. Wai et al. mention in their article that the results from the multi-resolution ridge detector could be beneficial to microcalcification false-positive reduction but the realization of the reduction is absent. Moreover, it is computationally inefficient to generate actual linear structures just for the purpose of confirming the association of an MCC candidate cluster with a linear structure in mammography CAD.

Therefore, a need exists for an improved approach for image linear structure verification in mammography.

The present invention is designed to overcome the problems set forth above. More particularly, with the present invention, all MCC candidate clusters are assumed being associated with linear structures until verified otherwise. Therefore, the present invention provides a method for linear structure (LS) verification in mammography CAD systems with the objective of reducing microcalcification (MCC) false-positives. The method of the invention is MCC cluster driven method and verifies linear structures with a small rotatable band centered around a given MCC candidate cluster in question. The classification status of an MCC candidate cluster is changed if its association with a linear structure is confirmed through the LS verification. There are mainly four identifiable features that are extracted from the rotatable band in the gradient magnitude and Hough parameter spaces. The LS verification process applies cascade rules to the extracted features to determine if an MCC candidate cluster resides in a linear structure area.

SUMMARY OF THE INVENTION

Briefly summarized, according to one aspect of the present invention, the invention provides a method for verifying linear structures in a digital mammographic image. One embodiment of the method comprises steps of: providing a configurable linear structure verifier in mammography CAD system, optionally using an MCC candidate cluster driven linear structure verification methodology; selecting parameters for the linear structure verifier from a plurality of different parameter generating sources, at least one of which is controllable by human input; configuring the verifier according to selected parameters; and verifying linear structure using cascade rules. The cascade rules may be trained with a combination of mammographic images of cancer cases and mammographic images of normal cases.

According to another aspect of the invention, the invention resides in a method of an MCC candidate cluster driven linear structure verification in mammographic images. One embodiment of the method includes the steps of locating a plurality of MCC candidate clusters whose characteristics resemble that of true MCC clusters; extracting rotatable bands in the mammographic image with the geometric parameters of the MCC candidate clusters; processing the rotatable bands to verify the presence of linear structures; attaching a tag to a cluster if the verification process determines that linear structures are present; further analyzing the rotatable bands; and removing the tag if the analysis process concludes that said tag is attached incorrectly.

In the various embodiments of the inventive method, the mammographic image may be a digitized X-ray film mammogram, or a digital mammogram captured with a computerized radiography system, or a digital mammogram captured with a digital radiography system.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 7A and 7B are illustrations respectively of an exemplary band that covers an object in a region of interest in a digitized mammogram and the corresponding actual eigenvalue band integral profile.

DETAILED DESCRIPTION OF THE INVENTION

Figure 1:
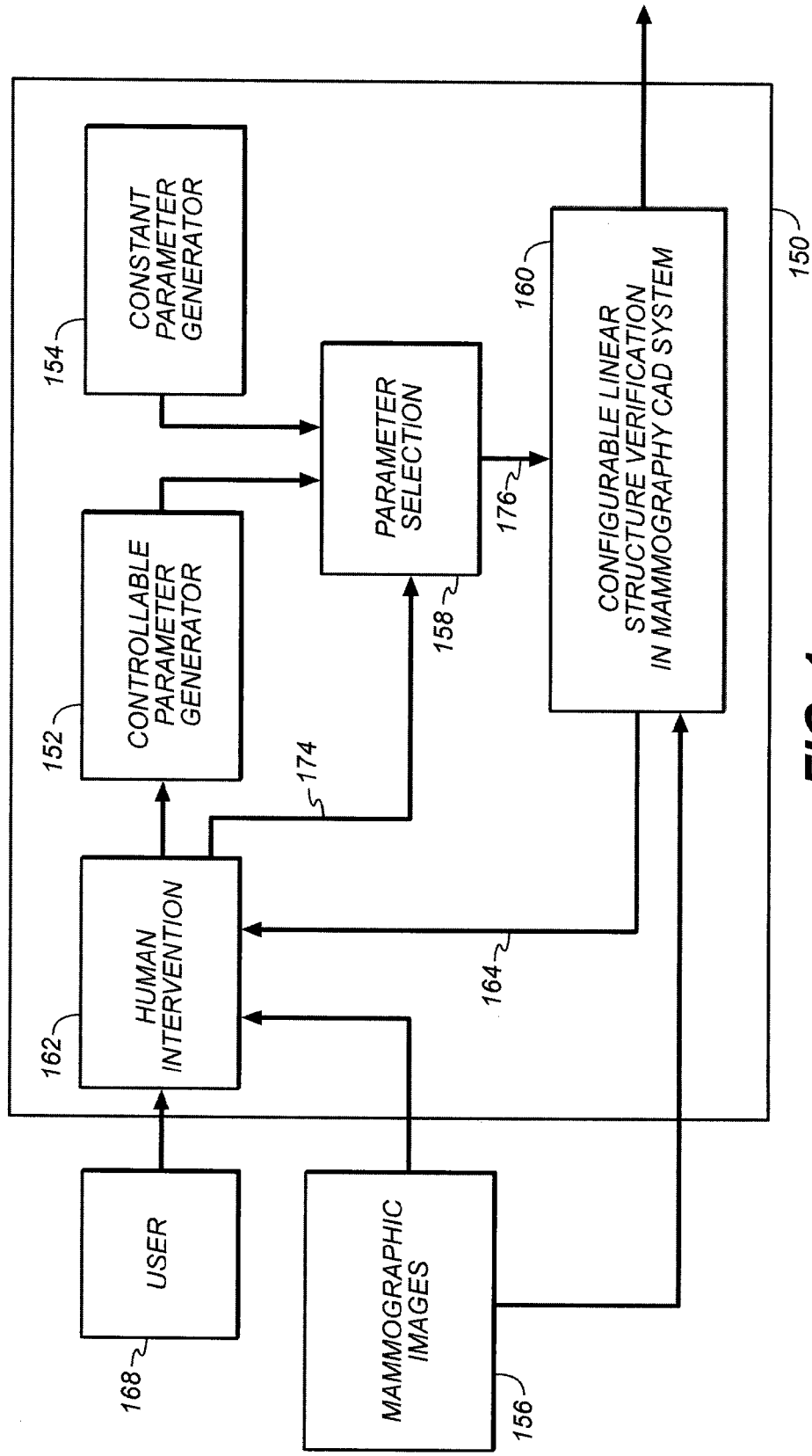
FIG. 1 is an illustration of an embodiment of the method of the invention for image linear structure verification in medical imaging.

The following is a detailed description of the preferred embodiments of the invention, reference being made to the drawings in which the same reference numerals identify the same elements of structure in each of the several figures.

Reference is made to commonly assigned, copending U.S. patent application Ser. No. 11/834,243 filed Aug. 6, 2007 by Chen et al entitled LINE STRUCTURE DETECTION AND ANALYSIS FOR MAMMOGRAPHY CAD.

Referring to FIG. 1, the method of the present invention will be outlined. FIG. 1 is a work flow chart 150 illustrating an embodiment of the linear structure verification method of the present invention. There are many variations in appearance of linear structures in mammograms in terms of contrast, brightness, texture and morphological shapes, among others. Therefore, in a practical image processing system it is desirable, as one measure, to synergistically integrate the skills of the human operator of the system with the power of the computer in the process of linear structure verification. A typical human excels in creativity, use of heuristics, flexibility and common sense; while a computer excels in speed of computation, strength and perseverance. This synergy of human and computer can be realized by incorporating a verification parameter control into the process.

In FIG. 1, there are provided steps of parameter selection 158 and human interventions 162 that allow a human operator or user 168 to participate in the process loop. Parameter selection step 158 allows selection of a set of parameters either from a constant parameter generator 154 or a controllable parameter generator 152. Parameter selection step 158 sends the selected parameters to a configurable linear structure verification step 160 through a forward path 176. Controllable parameter generator 152 is manipulated by operator 168 through a human intervention step 162. Operator 168 receives information on mammographic images from input 156 or feedback on path 164 from verification step 160. Then the operator makes a decision to use parameters either from constant parameter generator 154 or from controllable parameter generator 152.

Figure 2A:
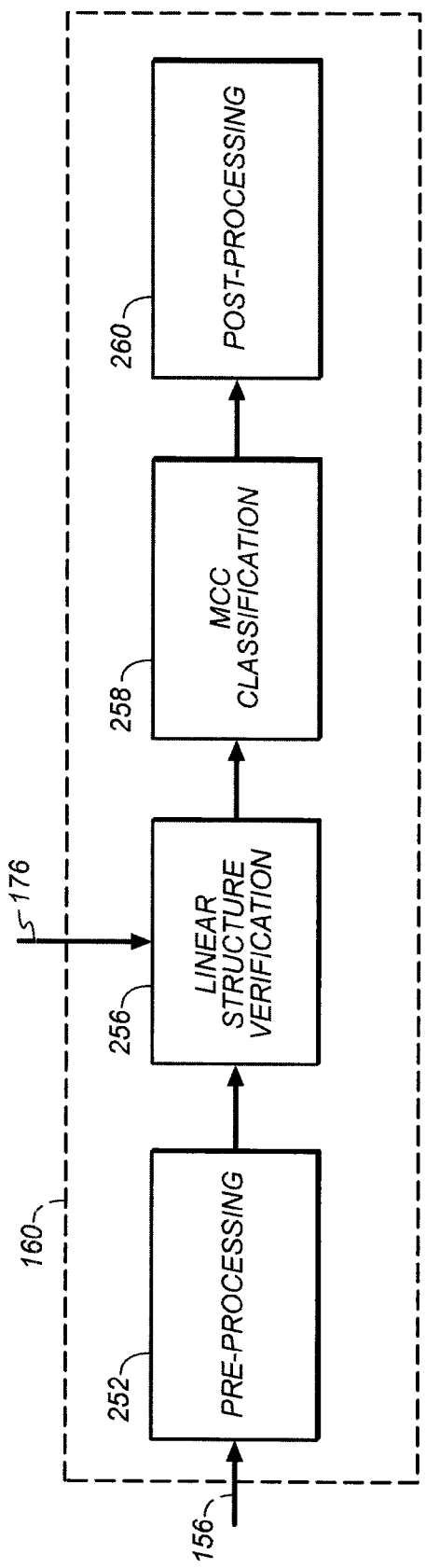
FIGS. 2A and 2B are illustrations of exemplary workflows of an embodiment of the method of the current invention.
Figure 2B:
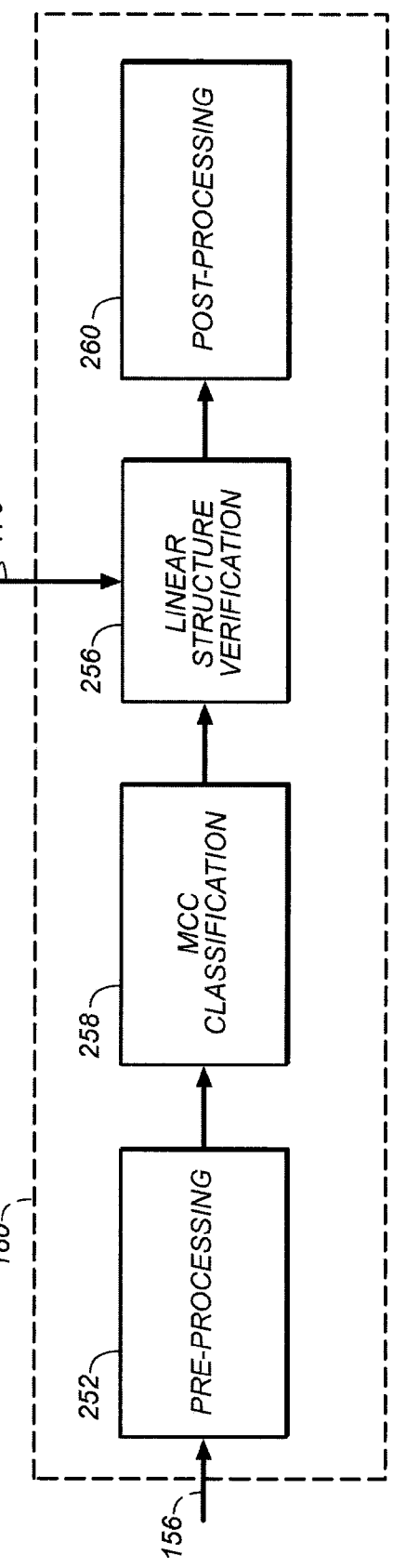

A feature of the present invention is that it provides an integrated solution to the linear structure verification problem by constructing a configurable verification system with a configurable verifier. This configurable system can be configured or reconfigured by commands from operator 168 through a command path 174. In general, the configurable verifier can be used in different positions in a workflow (or equivalently, forming different workflows). Exemplary workflows for verification step 160 are depicted in FIGS. 2A and 2B. In FIG. 2A, mammographic images on input 156 are first processed in pre-processing step 252 that applies various image processing algorithms such as filtering, morphological processing, feature extraction, etc. to the incoming images to form microcalcification clusters. Referring to FIG. 2A, for a first exemplary workflow from verification step 256 to MCC classification step 258, the microcalcification clusters enter step 256 followed by step 258 that classifies microcalcification clusters into malignant or benign types. However, MCC classification itself is not the focus of the present invention. The above described workflow is a type of pre-classification linear structure verification. Referring to FIG. 2B, for a second exemplary workflow, the microcalcification clusters enter the classification step 258 first, followed by the linear structure verification step 256. This is a type of post-classification linear structure verification. The output from either of the exemplary workflows goes to a post-processing step 260 that consolidates cancer detection results from other detection modules (such as mass lesion detection, not discussed in the present invention) in the mammography CAD system.

The use of the first exemplary workflow (256 to 258) reduces the computational burden of step 258 in terms of the number of MCC clusters to be classified since step 256 removes a sizable quantity of MCC clusters from the candidate list. It does, however, require the CAD classifier in step 258 to be retrained if the linear structure verification (256) is an add-on step. The use of the second exemplary workflow (258 to 256) enables a kind of 'plug and play' feature for the mammography CAD system if linear structure verification step 256 is an add-on step. It does not require the CAD classifier in step 258 to be retrained. Linear structure verification step 256 only processes those MCC clusters that are classified as true positives by MCC classification step 258.

Persons skilled in the art understand that a mammography CAD system can be designed in such a way that the functionalities provided by linear structure verification step 256 can be part of the functionalities provided by the MCC classification step 258. In other words, steps 256 and 258 can be combined into a single unit. Persons skilled in the art can design an MCC classifier or the equivalent that has the capability of verifying linear structures for use in accordance with the present invention. In other words, linear structure verification step 256 and MCC classification step 258 can be combined into a single process. Known examples of linear structure verification are found in the published U.S. patent application of Schneider, et al, previously mentioned. An example of a classification step for MCC is described in an article entitled "Automatic detection of clustered microcalcifications in digital mammograms using mathematical morphology and neural networks", by Stelios Halkiotis et al., Signal Processing, Volume 87, Issue 7, July 2007.

In step 256, the linear structure verifier itself can be configured or reconfigured to have various functional combinations by commands from operator 168 through command path 174 via parameter selection step 158. Step 158 sends the selected parameters to step 160 through path 176. For example, to be detailed later, the linear structure verifier for step 160 can be configured so that a function of true positive protection is activated in the linear structure verification process. The linear structure verifier can also be configured by commands from operator 168 so that different operational points can be realized. Exemplary operational points are numerical thresholds that are used in cascade rule based verification.

Figure 3:
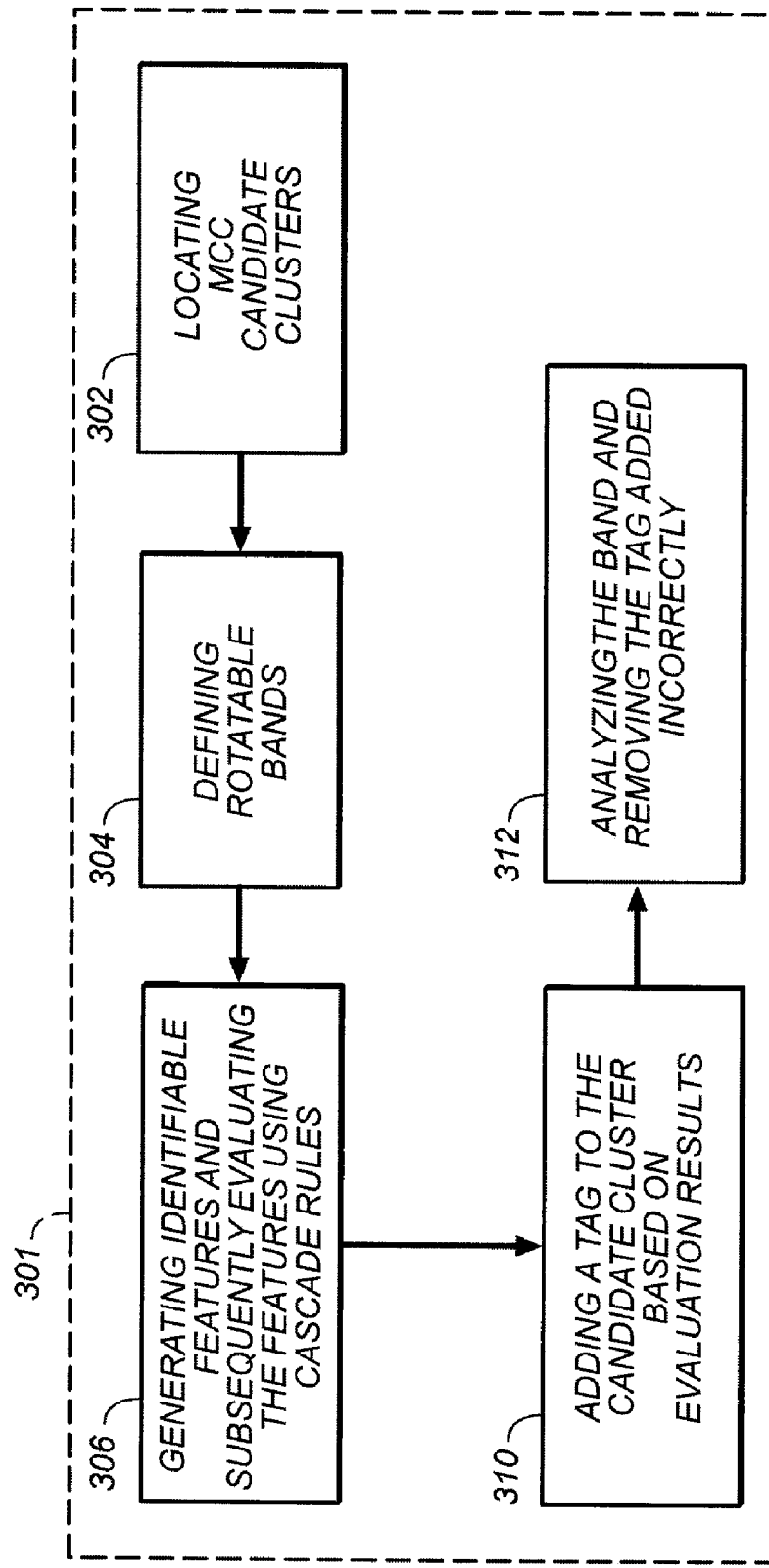
FIG. 3 is an illustration of an embodiment of the method of the invention using an MCC candidate cluster driven linear structure verification in mammographic images.

FIG. 3 depicts an embodiment of a method according to the invention of a workflow 301 for an MCC candidate cluster driven, linear structure verification in mammographic images. An exemplary linear structure verifier includes algorithm steps 302, 304, 306, 310 and 312 and can be used in step 160. Step 302 receives mammographic images which can be digitized X-ray film mammograms, digital mammograms captured with computerized radiography systems or mammographic images captured with digital radiography systems. In Step 302, a plurality of image processing and computer vision procedures are applied to the input mammographic images to find clusters of connected pixels that present characteristics which are similar to that of microcalcification in the mammogram. Exemplary characteristics can be statistical moments derived from pixel values in intensity (including intensity derivatives), spatial frequency, and topological domains. Step 302 forms candidate clusters using the clusters of connected pixels found. The clusters of connected pixels are also called microcalcification candidate spots. Each candidate cluster formed in Step 302 has a plurality of microcalcification candidate spots that are close to each other within a certain distance.

In step 304, rotatable bands are defined with the geometric parameters of the MCC candidate clusters located in the image. The defined bands enclose all or part of the microcalcification candidate spots of the candidate clusters. In step 306, various algorithms are applied to the rotatable band to determine if linear structures present. An exemplary algorithm is the cascade rule based evaluation of features extracted from rotatable bands discussed in the present invention. An exemplary technique is described in detail later in this specification. The classification of MCC as a potential cancerous site is desirable. However, the configuration of multiple sites can be indicative of normal or non-cancerous condition. This subsequent analysis is further requirement and is not in conflict with the classification process. Step 310 attaches a tag to the candidate cluster based on the evaluation results in step 306. The tag signifies the presence of linear structures. Step 312 further analyzes the band with image analysis algorithms such as topological analysis to assess the correctness of the tag. The tag will be removed if it is attached to the cluster incorrectly.

Curvilinear structures appear in the mammographic images due to the curvilinear appearance of blood vessels, lactation ducts, and ligaments of the breast as projected on a mammogram. Vascular lines are large calcified blood vessels on a mammogram. Microcalcifications are bright spots on mammograms and usually the only signs indicating early breast cancers. Microcalcification spots appear usually in clusters, and malignant microcalcification spots usually have irregular shapes. The curvilinear structure is a net of massive and complex curvilinear markings on a given mammogram.

Due to the projection of three-dimensional breast into a two-dimensional mammogram, different parts of the curvilinear structure may have different appearances with varying width, lengths and different contrasts to the surrounding breast tissue. The option of pre-classification global mask generation to extract curvilinear structure may be of limited use because global curvilinear marking is a massive structure, and accurate mask extraction is not an easy task. Global mask tends to extract only small portion of linear structure or extract too many "lines".

Figure 4B:
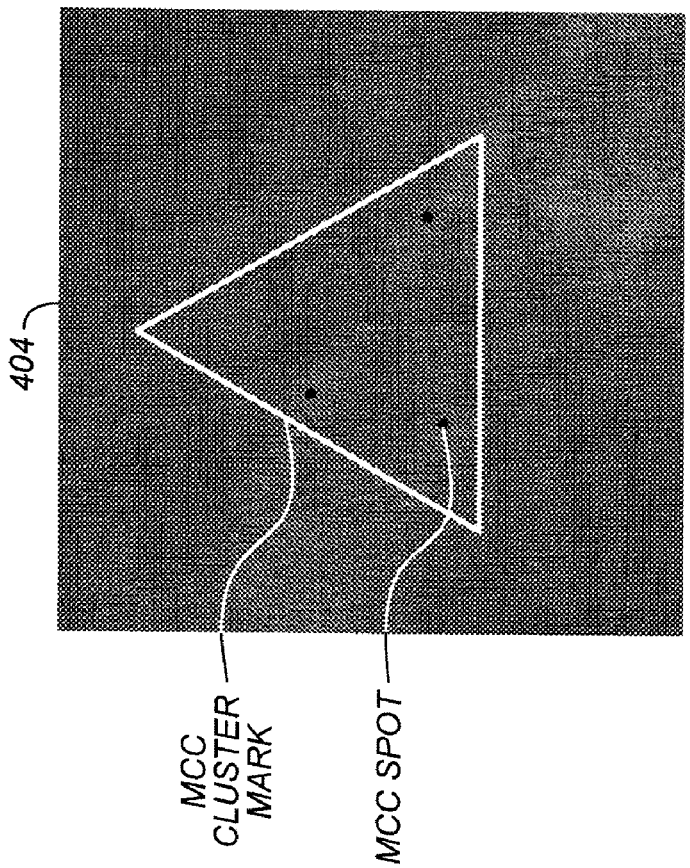
FIGS. 4A and 4B respectively show a mammogram and an enlarged region of interest in the mammogram illustrating exemplary MCC candidate clusters.
Figure 4A:
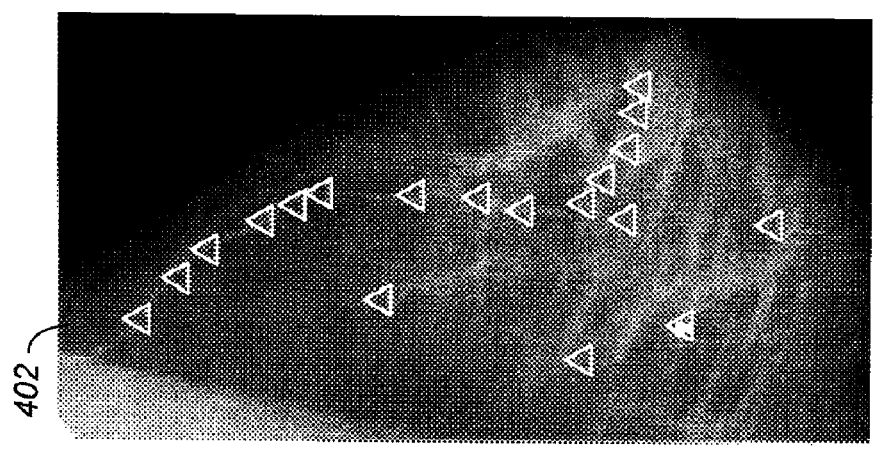

In accordance with the invention, an alternative is, after initial MCC candidate classification, to identify linear structures only in the neighborhood where the MCC candidate clusters reside. For each of the candidate clusters that have passed initial classification, a region of interest (ROI) is defined that encloses the MCC candidate spots of each of the candidate clusters. An MCC FP reduction procedure is applied to a small region (ROI) centered around each MCC candidate cluster to avoid the unnecessary influence from the rest of the breast. It reduces processing time since the number of MCC candidate clusters is limited and only a small portion of the breast area needs to be processed, in comparison to global line mask approach. FIG. 4A shows an exemplary mammogram 402 with small triangles that indicate the MCC candidate clusters identified as previously described in the pre-processing state. FIG. 4B shows an enlarged image 404 of the ROI that contains one of the MCC candidate clusters. The MCC FP reduction procedure will be applied to only a fraction of all MCC candidate clusters 402 indicated in FIG. 4A.

Figure 8:
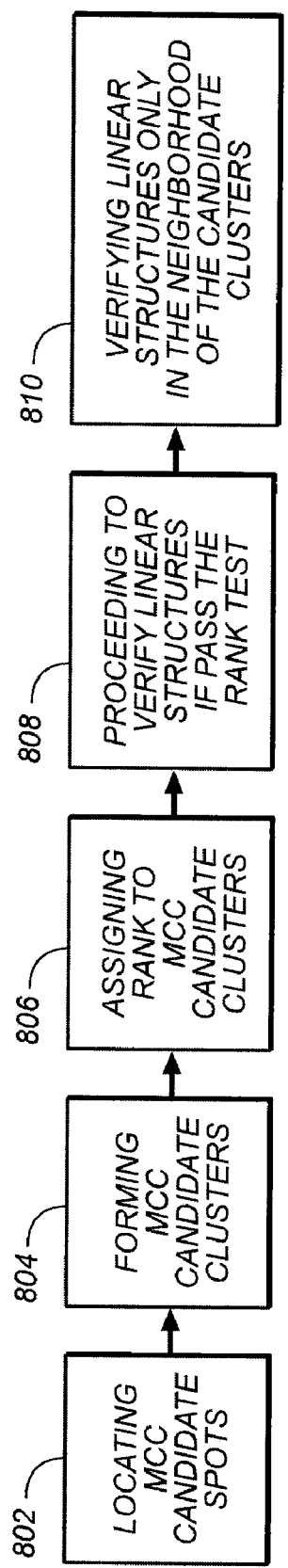
FIG. 8 is a flowchart showing exemplary steps of linear structure verification of the present invention.

The workflow depicted in FIG. 8 outlines the algorithm steps needed to perform a reduction of MCC FP and explains the functions of steps 252, 258 and 256 of FIG. 2B. In step 802 digital mammograms are processed to locate MCC candidate spots and detect the potential cancerous MCC spots. Step 804 groups MCC candidate spots into MCC candidate clusters with a minimum number of 2 or 3 MCC candidate spots within an area approximately 6 mm×6 mm in size. The number of MCC candidate clusters allowed is limited to, e.g., 30 per image. Those candidates usually appear as the bright spots on a mammogram. But there are certain other types of bright spots that are false-positive, such as large benign calcifications, calcifications within the arterial walls, bright glandular tissues, film artifacts or mammogram markers. These types of false-positive usually present difficulty for later processing in the MCC classification algorithm, so they should be limited. In 806, the MCC candidate clusters are classified or ranked by a classifier such as a neural network that is pre-trained. This classification process can be followed by another process that applies a set of rules to each candidate cluster after classification. The result of the rule, if true, is to set the candidate rank to normal.

As stated previously, not all MCC candidate clusters are subject to linear structure verification. A test in step 808 evaluates the rank of each MCC candidate cluster after classification and sends those candidate clusters that are classified as abnormal to the linear structure verification step 810. Note that in FIG. 4 the MCC candidate clusters 402 indicated by small triangles include those classified as normal as well as abnormal.

The MCC cluster driven linear structure verification method of the present invention employs mainly four identifiable features that are extracted from the gradient magnitude and Hough parameter domains. The linear structure verification process applies cascade rules to the extracted features to determine if an MCC candidate cluster is associated with a linear structure. The method is discussed in depth next.

Features of Ensemble Average of Lines in Gradient Magnitude Space

Figure 9B:
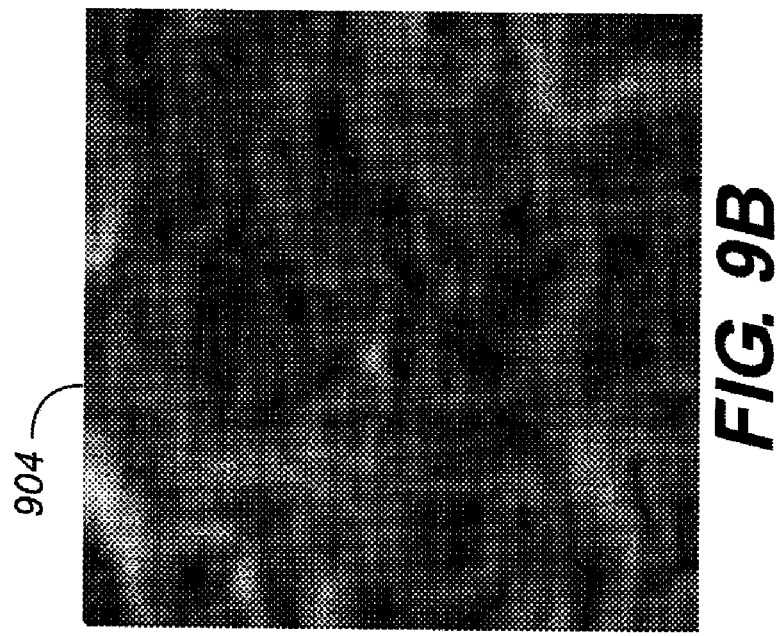
FIGS. 9A and 9B are illustrations respectively of exemplary regions of interest in the gradient magnitude space.
Figure 9A:
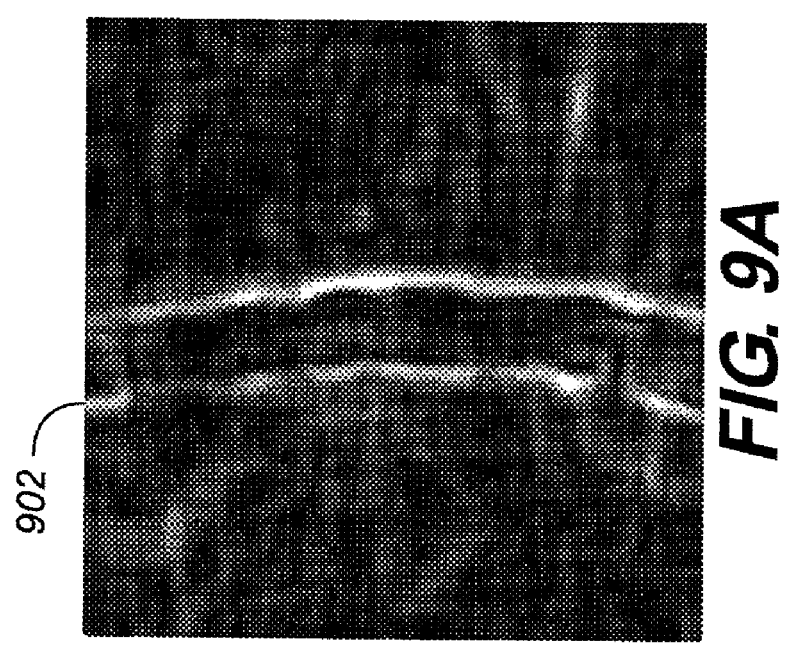

In the linear structure verification step, an intensity ROI 404 as in FIG. 4 is transformed to a gradient magnitude ROI (gROI). The benefit of working in the gradient magnitude space is that the statistics gathered from gROI are essentially intensity invariant. FIGS. 9A and 9B display a pair of exemplary gROIs 902, 904 used in the present algorithm. Note that the position and size of an ROI are determined by the positions of the underlying MCC candidate spots that the cluster contains. As stated before the design philosophy in the present invention is that all MCC candidate clusters are assumed being associated with linear structures until verified otherwise. The verification process starts with extracting information from a rotatable band that covers all or part of candidate spots in the MCC candidate cluster under investigation.

Figure 10A:
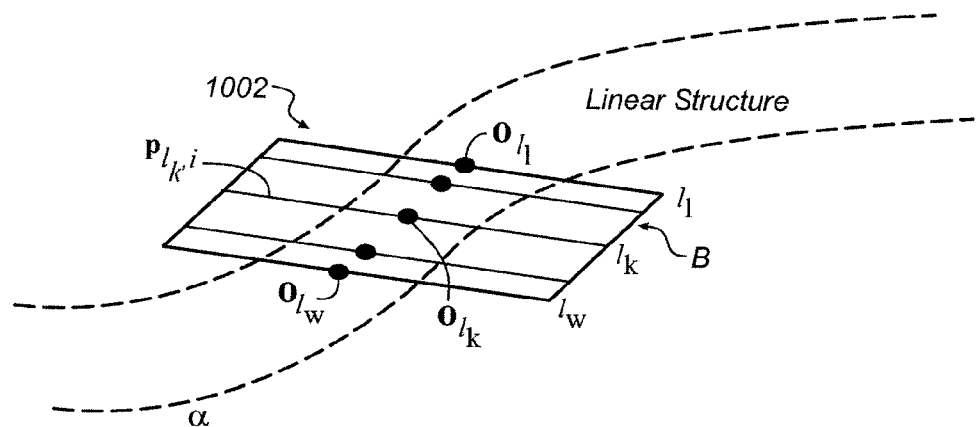
FIGS. 10A and 10B are illustrations of graphs of rotatable bands.
Figure 10B:
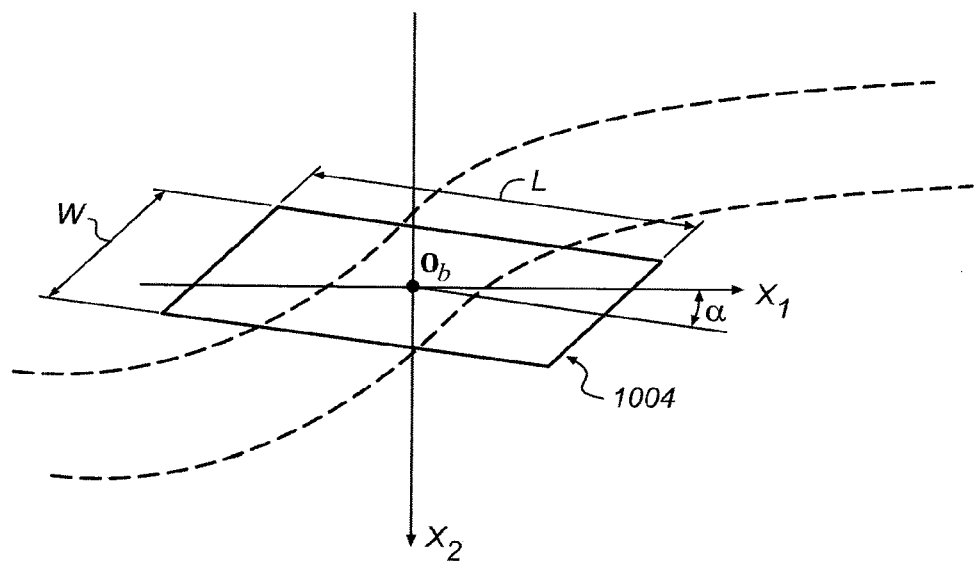

FIGS. 10A and 10B respectively depict graphs or sketches 1002, 1004 of linear structures, each with a rotatable band. For analytical purposes, in graph 1004 define the band center $o_b$ as the origin of a local coordinate system ($X^1, X^2$) whose axes are parallel to the image (gROI) coordinate system axes which are generally parallel to the vertical and horizontal edges of the image respectively. Angle $\alpha$ determines the band orientation with respect to the local coordinate system.

Denote the rotatable verification band by $B(\alpha)$ that contains W lines $l_k(\alpha)$:

$$B(\alpha) = \{l_k(\alpha)\}; k \in [1, \ldots, W] \quad (1)$$

Denote the line center of line $l_k(\alpha)$ by $o_{l_k}$. Denote a pixel on line $l_k(\alpha)$ by $p_{l_k,i}(\alpha)$. Line $l_k$ is a collection of pixels:
$l_k = \{\hat{I}(p_{l_k,i}(\alpha))\}$; $i \in [-(L-1)/2, \ldots, (L-1)/2]$, L is the line length. Here $\hat{I} = |\nabla I|$ is the gradient magnitude image (gROI) of the intensity image (ROI) denoted by I. In the graph 1004 displayed in FIG. 10, the band is in a position where lines $l_k$ are approximately perpendicular to the medial axis of the linear structure. For notation simplicity, parameter $\alpha$ is omitted in some of the expressions in the following discussions.

Denote an ensemble average of the set of lines $\{l_k\}$ in the band by $s(\alpha)$ with elements $s_i(\alpha)$: $s(\alpha) = \{s_i(\alpha)\}$, where $$s_i = \frac{1}{W} \sum_{k=1}^{W} \hat{I}(p_{l_k,i}) \quad (2)$$

Referring back to FIGS. 10A and 10B, the pixel coordinate $p_{l_k,i}$ can be computed as
$p_{l_k,i} = i f_l + o_{l_k}$; where the centers $o_{l_k}$ are obtained through $$o_{l_k} = k f_b + o_b; k \in [-(W-1)/2, \ldots, (W-1)/2;];$$

$$o_b = \begin{bmatrix} o_b^{x^1} \\ o_b^{x^2} \end{bmatrix}; f_b = \begin{bmatrix} f_b^{x^1} \\ f_b^{x^2} \end{bmatrix} = \begin{bmatrix} \sin(\alpha) \\ \cos(\alpha) \end{bmatrix}; o_{l_k} = \begin{bmatrix} o_{l_k}^{x^1} \\ o_{l_k}^{x^2} \end{bmatrix};$$

$$f_l = \begin{bmatrix} f_l^{x^1} \\ f_l^{x^2} \end{bmatrix} = \begin{bmatrix} \cos(\alpha) \\ -\sin(\alpha) \end{bmatrix}.$$

Those skilled in the art may notice that the bands $B(\alpha)$ at different angles are not extracted through the conventional method of interpolation but through a simple sampling procedure that is quite adequate for the present application.

Various features can be generated from the processing of the bands. Two main features are introduced in the present invention. One of the features is a maximum relative magnitude of the ensemble average curves. The relative magnitude of the ensemble average curve of a set of lines in the band at a particular angle is simply defined as $$\Psi(\alpha) = \max(s(\alpha)) - \min(s(\alpha)) = \max_i(s_i) - \min_i(s_i).$$

In practice, angle α is chosen at a few discrete orientations. Therefore, the relative magnitude of the ensemble average curve can be expressed as $\Psi(\alpha_j)=\max(s(\alpha_j))-\min(s(\alpha_j))$; $j\in[1,\ldots,N_\alpha]$. It can be further simplified as $\Psi_j=\max(s_j)-\min(s_j)$; $j\in[1,\ldots,N_\alpha]$.

The maximum relative magnitude of the ensemble average curve is then obtained as $$\Psi = \max_j(\Psi_j). \tag{3}$$

Accordingly, band $B_j$ that produces maximum relative magnitude is denoted by $B_\Psi$.

With the relative magnitude of the ensemble average curve, another feature, ensemble average ratio $\Re$ can be computed as:

$$\Re = \max_j(\Psi_j) \Big/ \min_j(\Psi_j). \tag{4}$$

It will be clear that if an MCC candidate cluster is not associated with a linear structure the ensemble average ratio $\Re$ is close to 1, which signifies the 'isotropic' nature of the underlying structure measured by using the ensemble averaging. On the other hand, if an MCC candidate cluster is associated with a linear structure the ensemble average ratio $\Re$ moves away from 1, which signifies the 'anisotropic' nature of the underlying structure.

Features in Hough Transformation Domain

Two features from the Hough Transformation domain are used in the linear structure verification process in the present invention. It will be detailed later that the present method utilizes a set of cascade rules to accomplish the verification task. The relative magnitude of the ensemble average curve and the ensemble average ratio are the first two features that are evaluated. This first evaluation process tags a cluster with a status of being associated with linear structures (LS), not being associated with linear structures (non-LS), or uncertain. As a result, any MCC candidate cluster in an uncertain status will be further evaluated by the rules that are applied to the features of Hough parameters.

The first evaluation operation on ensemble averages is, in general, not orthogonal to the second evaluation operation on Hough parameter in the present application. In other words, these two operations may explore the same underlying evidence to support the linear structure verification process. It is true, however, from the computational complexity point of view, that the computation of ensemble averaging is linear while Hough Transformation is nonlinear in nature. Also, the execution of ensemble averaging of lines in multiple angles is applied to all MCC candidate clusters. The Hough Transform is only applied to a handful clusters (gROIs) in a single angle position that is determined by the first evaluation operation of ensemble averaging of lines in the rotatable band.

Those skilled in the are understand that Hough Transform maps points on a line in Cartesian space to curves (sinusoids) in the Hough parameter space. Points that are collinear in the Cartesian space generate curves that intersect at a common point (forming a peak in the Hough parameter space).

Referring to FIG. 10, each point $p_{i_k,i}$ in band B(α) that has a Cartesian coordinate is transformed into a discretized (r,θ) curve in Hough parameter space; where r is the length of a normal from the origin to line in band B(α) and θ is the orientation of the normal with respect to the $X^1$ axis.

For the exemplary gROI 902 shown in FIG. 9A, there will be two high peaks in the Hough parameter accumulator array indexed with discretized r and θ. These two peaks will appear approximately at the same angle θ but at different r lengths. It is therefore a feature (or measure) of "angle spread" $\delta_\theta$ is defined as following.

Denote the Hough peak array by $H=\{h_{i,j}\}$ and its corresponding angle array by $\Theta=\{\theta_{i,j}\}$; where $i\in[1,\ldots,N_r]$; $j\in[1,\ldots,N_\theta]$. $N_r$ is the number of quantized length intervals and $N_\theta$ is the number of quantized angle intervals.

Collect a subset $H^s=\{h_{i,j}^s\}$ of H; the elements $h_{i,j}^s$ all have values above $\aleph$ percent of the highest peak value in H. Corresponding to the subset $H^s$, there is a subset $\Theta^s=\{\theta_{i,j}^s\}$ of $\Theta$. The angle spread $\delta_\theta$ can be readily computed as $$\delta_\theta = |\max_s(\Theta^s) - \min_s(\Theta^s)|. \tag{5}$$

If there are parallel thin lines presented in a band B(α), the angle spread $\delta_\theta$ for that band must be zero or close to zero. On the other hand, if random structures are presented in a band B(α), the angle spread $\delta_\theta$ will be large.

Another feature from Hough space is the normalized maximum Hough peak that is simply defined as $$\varphi_h = \max_{i,j}(h_{i,j}^s) / \text{sum}(h_{i,j}). \tag{6}$$

Additional Measure for TP Protection

Figure 11B:
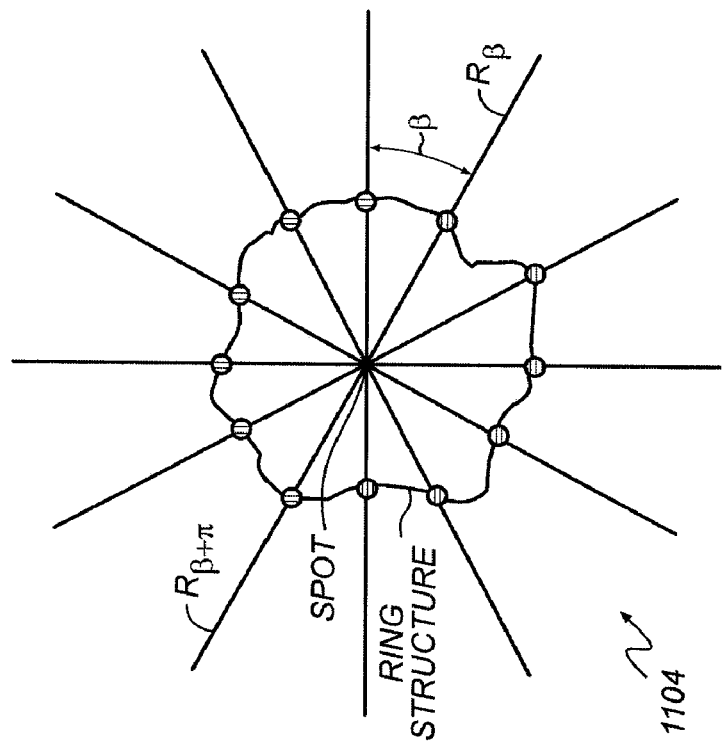
FIGS. 11A and 11B display respectively an exemplary region of interest with ring-like structure and a graph illustrating a ring-like structure search method.
Figure 11A:
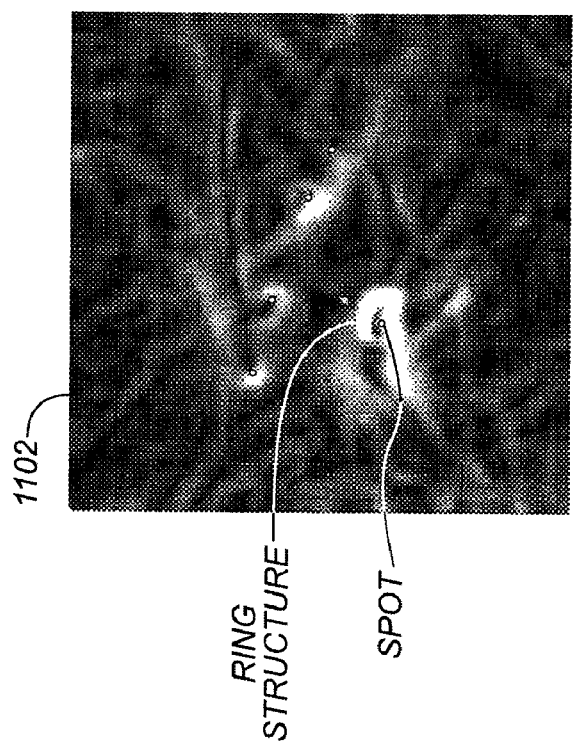

The inventors have observed that some of the true-positive MCC clusters may reside in an area where linear structure-like objects are present and can be verified as FPs. It also has been observed that true-positive MCC clusters may possess topological ring-like structures surrounding some of the spots (see a gROI 1102 in FIG. 11A). A method in accordance with one embodiment of the invention is hence crafted to take advantage of the ring structure in a cluster to protect true positives.

Using the spot as the origin, perform a search along a ray that radiates from the origin until the ray hits the ring or reaches a predefined distance without a hit. The search process can be formulated as following (referring to graph 1104 in FIG. 11B).

Denote a ray by $R_{k\beta}$ and its opposite ray by $R_{k\beta+\pi}$, where $\beta=\pi/N_R$; $k\in[1,\ldots,N_R]$. $N_R$ is a positive integer greater than one. Denote a hit array by $T=\{t_k\}$. The array elements $t_k$ are initialized as zero. Only if both $R_{k\beta}$ and $R_{k\beta+\pi}$ hit a ring, the corresponding array element $t_k$ will be set to one, otherwise, the corresponding array element $t_k$ remains zero.

A simple measure is therefore defined as the sum of hits $\xi_t$ that a hit array has. The measure is simply computed as $$\xi_t = \sum_k t_k. \quad (7)$$

Cascade Rule Based Linear Structure Verification

The features (or measures) described in the above sections are used in a cascade rule based verification algorithm that is summarized below. The paragraphs following the algorithm summary explain the workings of the algorithm:

```
for each_clst do
    if(rankChk (clst,rankThd ))
        gROIgnrt(clst,img,gROI);
        for each α_j where j ∈[1, ... ,N]do
            bandXtrct(clst,gROI,B_j,α_j);
            bandPfling(B_j,s_j)
        end
        profileFeatureXtrct(∀s_j,Ψ,ℜ); where j ∈[1, ... ,N]
        apply ProfileRules (clst,Ψ,ℜ);
        if status(clst) == uncertain
            bandHoughTrnsfm(B,H,Θ);
            HoughFeatureXtrct(H,Θ,δ_Θ,φ_h);
            applyHough Rules(clst,δ_Θ,φ_h);
        end
        if status(clst) == LS
            ringHitChk(clst,gROI,ξ_t);
            applyRingHitRules(clst,ξ_t);
        end
end
```

Function rankChk(clst, rankThd) returns a Boolean 'true' if an MCC cluster clst has a rank indicating its potential cancer status by comparing with a predefined threshold value rankThd based on the analysis of classification ROC curve.

Function gROIgnrt(clst, img, gROi) simply crops a region of interest (gROi) from the input gradient magnitude mammogram (img) using the position information of the underlying cluster (clst). The size of the gROI depends on the spread of MCC spots within the cluster.

Function bandXtrct(clst, gROI, $B_j$, $α_j$) further crops a band $B_j$ at angle $α_j$ from gROi. The center of the cropped band is at the geometric center of the spots within the cluster clst. In practice, the shape of a band is a square so that two, not one, ensemble average curves of two sets of lines (with respect to $α_j$ and $α_j+\pi/2$) can be computed (see Equation 2) with one band.

Function profileFeatureXtrct($∀s_j$, Ψ, ℜ) collects the ensemble averages and computes features (or measures) Ψ and ℜ according to Equations 3 and 4.

Function apply ProfileRules(clst, Ψ, ℜ) evaluates Ψ and ℜ with pre-determined boundaries (thresholds) then tags the cluster clst with a number indicating the status as 'LS (associated with linear structure)', 'non-LS (not associated with linear structure)', or 'uncertain'. The evaluation criteria will be detailed later.

If a cluster is labeled as 'uncertain', that cluster will be further evaluated by first applying a Hough Transform band-HoughTrnsfm(B, H, Θ) to the band and generates a Hough peak array H and an angle array Θ. The band B used in function bandHoughTrnsfm( ) could be the one (denoted by $B_Ψ$) that generates the maximum relative magnitude of the ensemble average curve in Equation 3. Or it could be a band having a different (usually larger) size but with the same orientation and center position as $B_Ψ$.

Function HoughFeatureXtrct(H, Θ, $δ_Θ$, $φ_h$) executes Equations 5 and 6. Function applyHoughRules(clst, $δ_Θ$, $φ_h$) evaluates $δ_Θ$ and $φ_h$ with pre-defined thresholds and tags the cluster clst with a number indicating the status as 'LS', or 'non-LS'.

If, after evaluating the features of the rotatable bands, a cluster is labeled as LS (associated with linear structure), function rightHitChk(clst, gROI, $ξ_t$) computes $ξ_t$ (see Equation 7) that is evaluated in function applyRingHitRules(clst, $ξ_t$). It basically checks the number of hits that each of the spots has in a cluster and changes the status from LS to non-LS if the maximum number of hits that any one of the spots has exceeds a threshold. The purpose of employing function rightHitChk(clst, gROI, $ξ_t$) is to analyze the band and the use function applyRingHitRules(clst, $ξ_t$) to remove the tag LS that is attached incorrectly.

Figure 12:
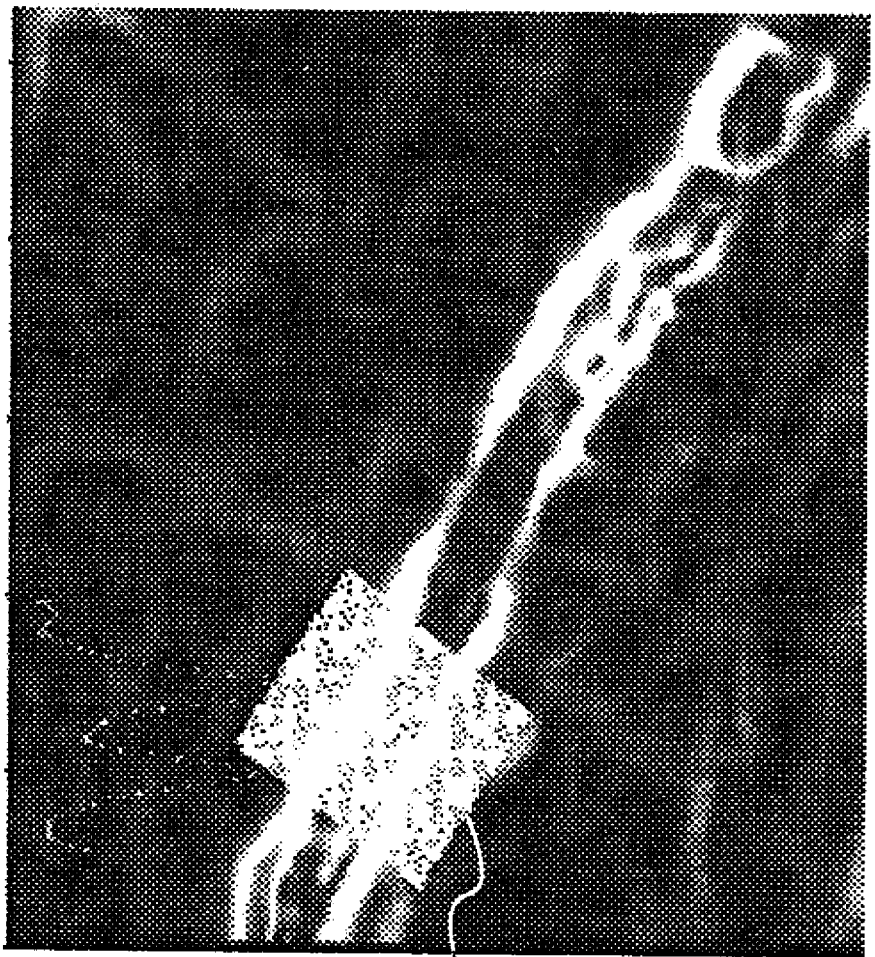
FIG. 12 is an illustration of an exemplary band that covers a blood vessel in a region of interest in a digitized mammogram.

The algorithm developed in the present invention has been applied to clinical mammograms for assessment. FIG. 12 shows an exemplary band that covers part of a blood vessel in a gradient magnitude image (gROI).

Figure 13:
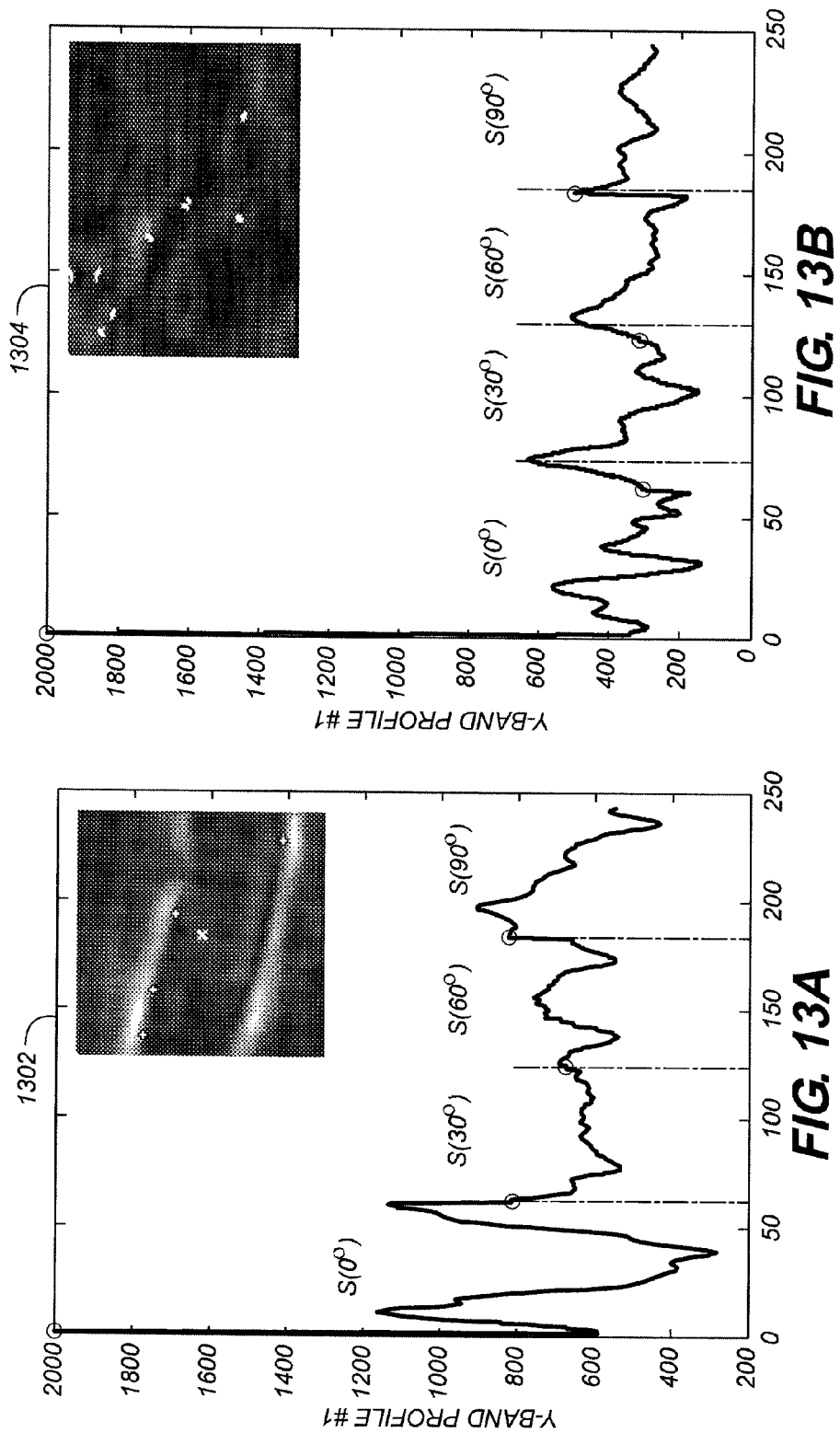
FIGS. 13A and 13B are respectively graphs illustrating exemplary curves of ensemble average of sets of lines at different angles.

FIGS. 13A and 13B depict the ensemble averages 1302 s(α) of band lines at 4 different angles for a gROI that has a linear structure. The ensemble average curve s(0°) at 0° has the highest relative magnitude comparing to the other three. These four ensemble average curves possess kind of 'anisotropic' property in terms of the relative magnitude. While the curves in graph 1304 in FIG. 13B display near 'isotropic' property for a gROI that does not have a linear structure.

Figure 14:
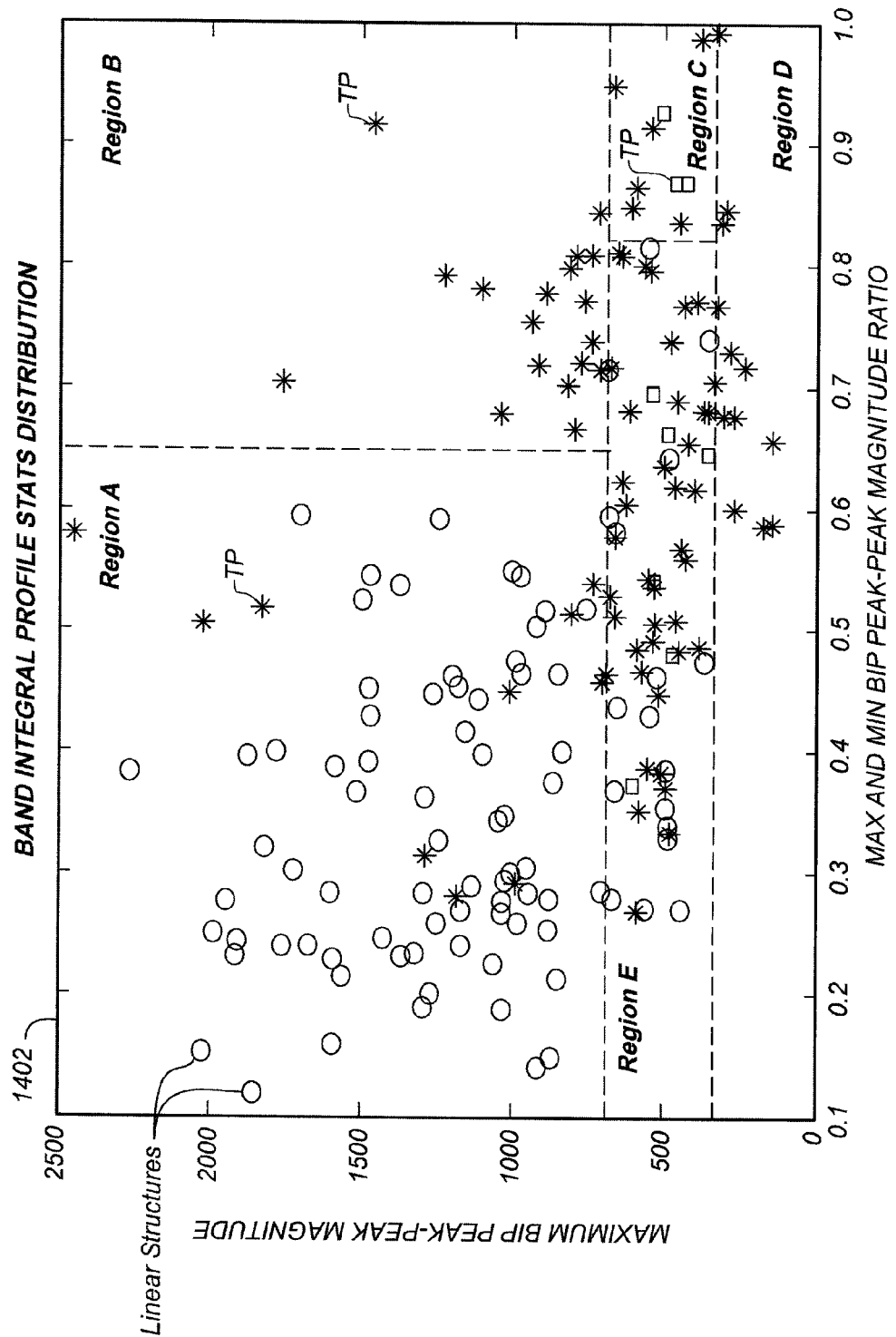
FIG. 14 is a graph illustrating an exemplary distribution of features related to ensemble average of lines.
Figure 15A:
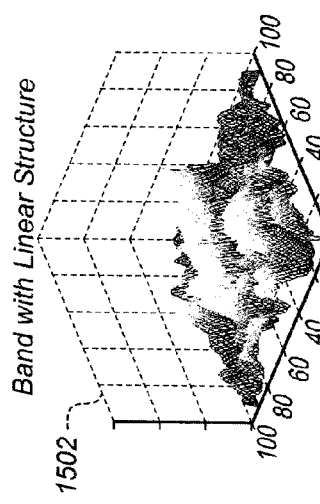
FIGS. 15A and 15B, 15C and 15D illustrate respectively exemplary regions of interest and their corresponding Hough accumulators.
Figure 15B:
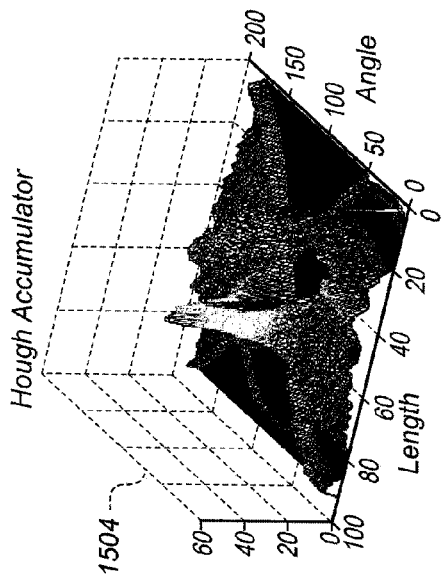
Figure 15C:
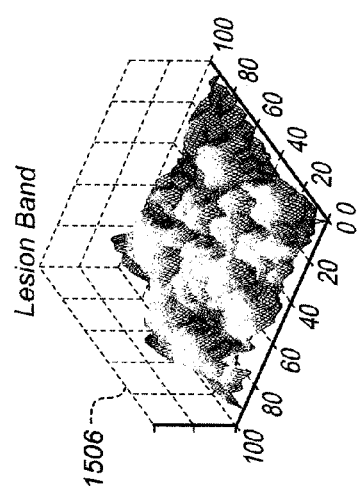
Figure 15D:
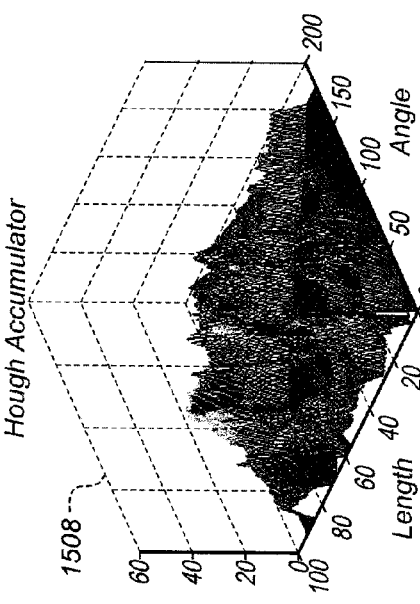

The distribution 1402 of features Ψ and ℜ is obtained from a number of training mammograms and shown in FIG. 14. It demonstrates that features Ψ and ℜ provide a statistically satisfactory separation for the clusters that have linear structures (LS) and the clusters that are true-positives (non-LS). Although sophisticated algorithms such as Support Vector Machine, a conventional pattern recognition technology popular in the field of computer vision, as will be understood by the person skilled in the art, could be used to find the feature separation boundaries, the distribution in FIG. 14 is empirically divided into different regions. LS clusters are concentrated in region A, while non-LS clusters spread mostly in regions B, C and D. Region E contains the clusters with uncertain status. Exemplary rules are devised based on the division of the above regions in the present invention for function apply ProfileRules(clst, Ψ, ℜ). Exemplary pre-defined thresholding values for Ψ are 700 and 300. Exemplary predefined thresholding value for ℜ is 0.6.

FIGS. 15A to 15D display the 3D plots of a band 1502 with linear structures and its corresponding Hough accumulator 1504 plot with length r and angle θ axes. Set an exemplary ℵ=90. Intuitively, the angle spread $δ_Θ$ for the elements $h_{i,j}{}^s$ having values above ℵpercent of the highest peak value is very small. While for the lesion band 904 in FIG. 9, the angle spread $δ_Θ$ obviously has a much larger value because of the multiple peaks with similar values sprouted across the angle axis in graph 1508.

Figure 16:
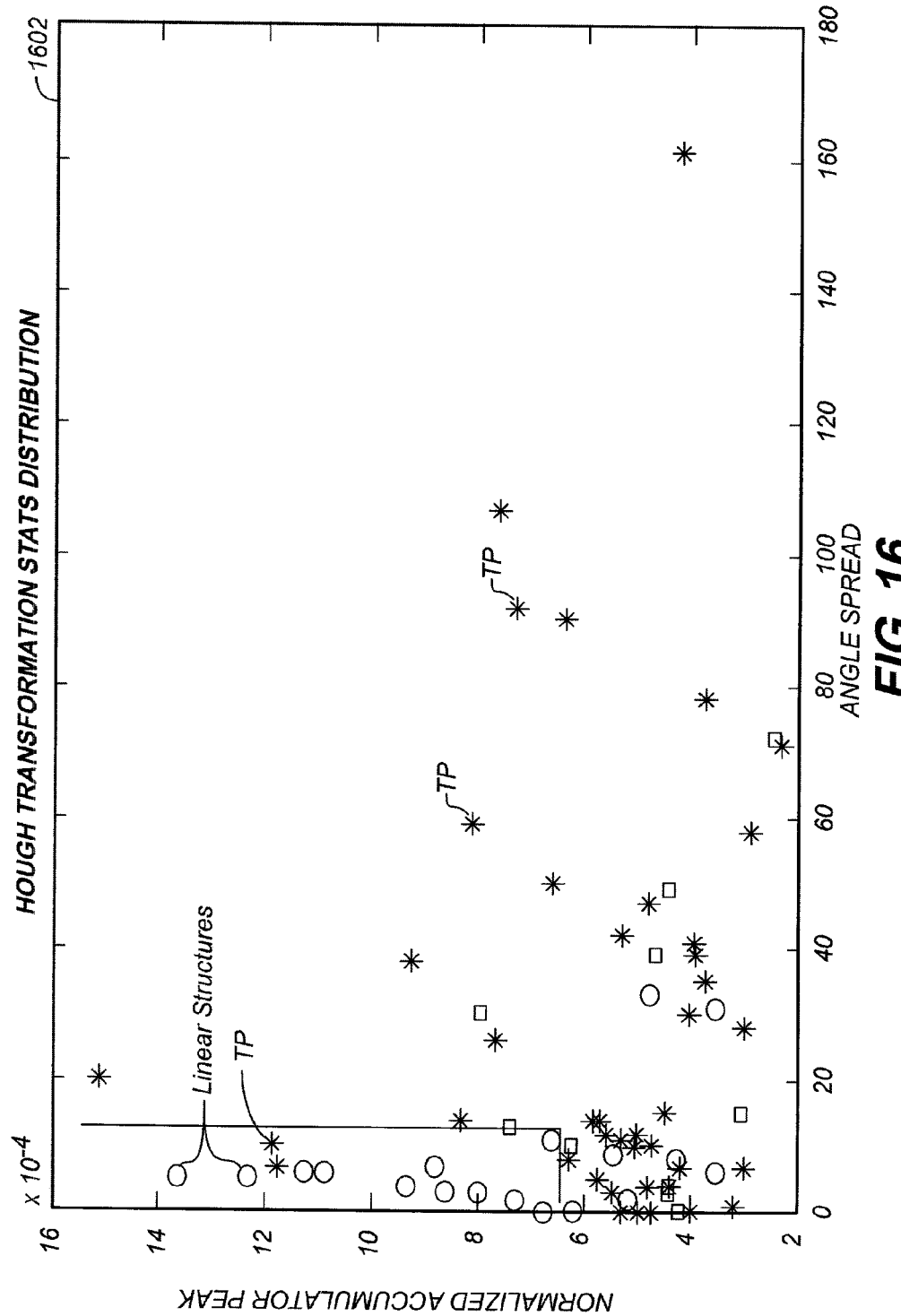
FIG. 16 is a graph illustrating an exemplary distribution of features related to Hough accumulator.

The distribution 1602 of features r and θ in FIG. 16 also shows a good separation between the LS clusters and non-LS clusters. The solid lines in FIG. 16 provide the empirical thresholds for the execution of function applyHoughRules (clst, $δ_Θ$, $φ_h$). Exemplary predefined threshold $δ_Θ$ for is 10 and exemplary predefined threshold for $φ_h$ is 0.0005.

Figure 17:
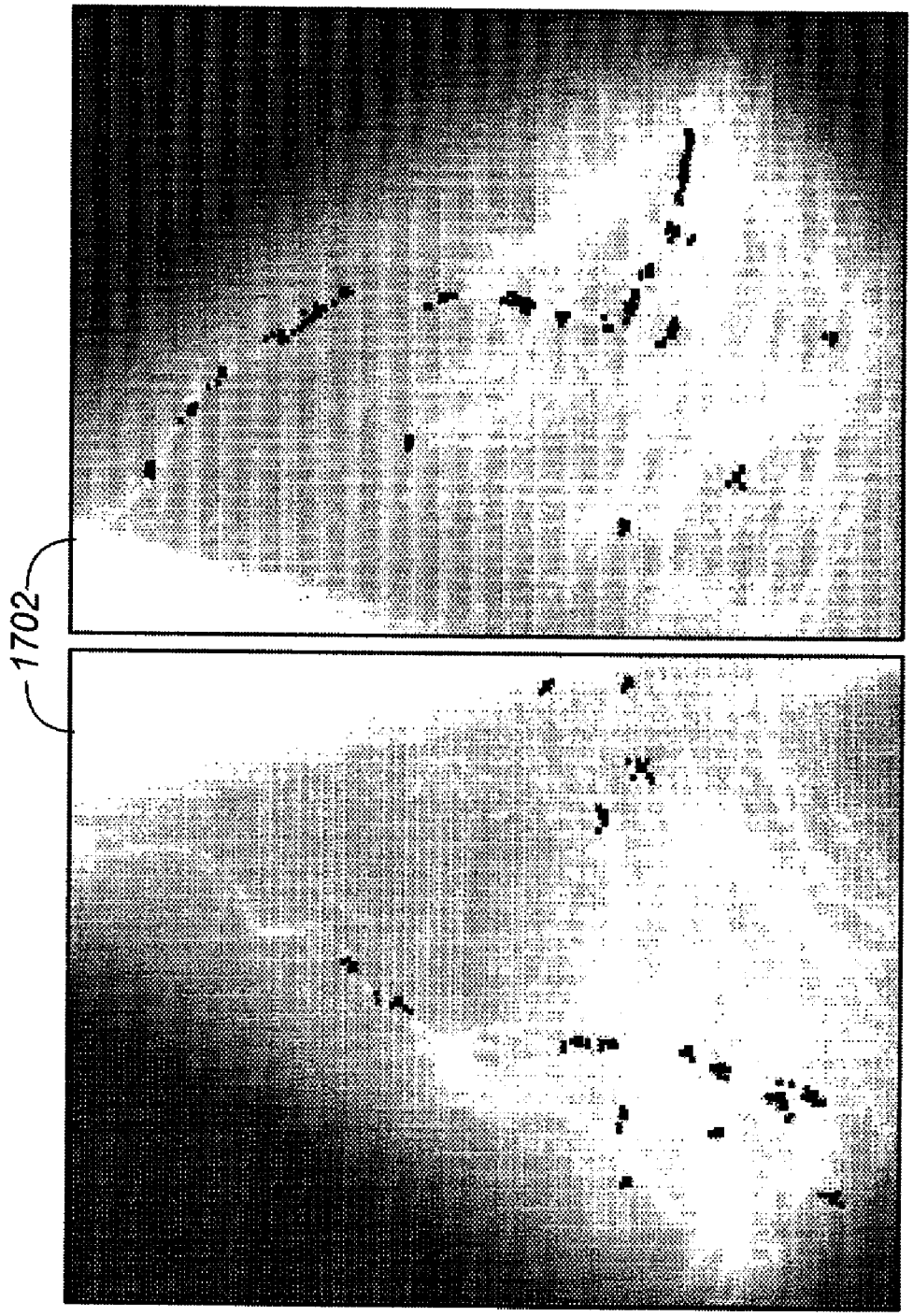
FIG. 17 is an illustration of exemplary mammograms with linear structures.

FIG. 17 illustrates the result of applying the current FP reduction algorithm to a pair of mammograms 1702 that clearly have linear structures (blood vessels) with MCC candidate clusters attached to them. The encircled dots are the remaining false-positives. The remaining, not circled dots indicate that potential MCC cluster candidates are correctly verified as associated with linear structures. Note that the effect of other classifiers is not shown in FIG. 17.

Figure 18:
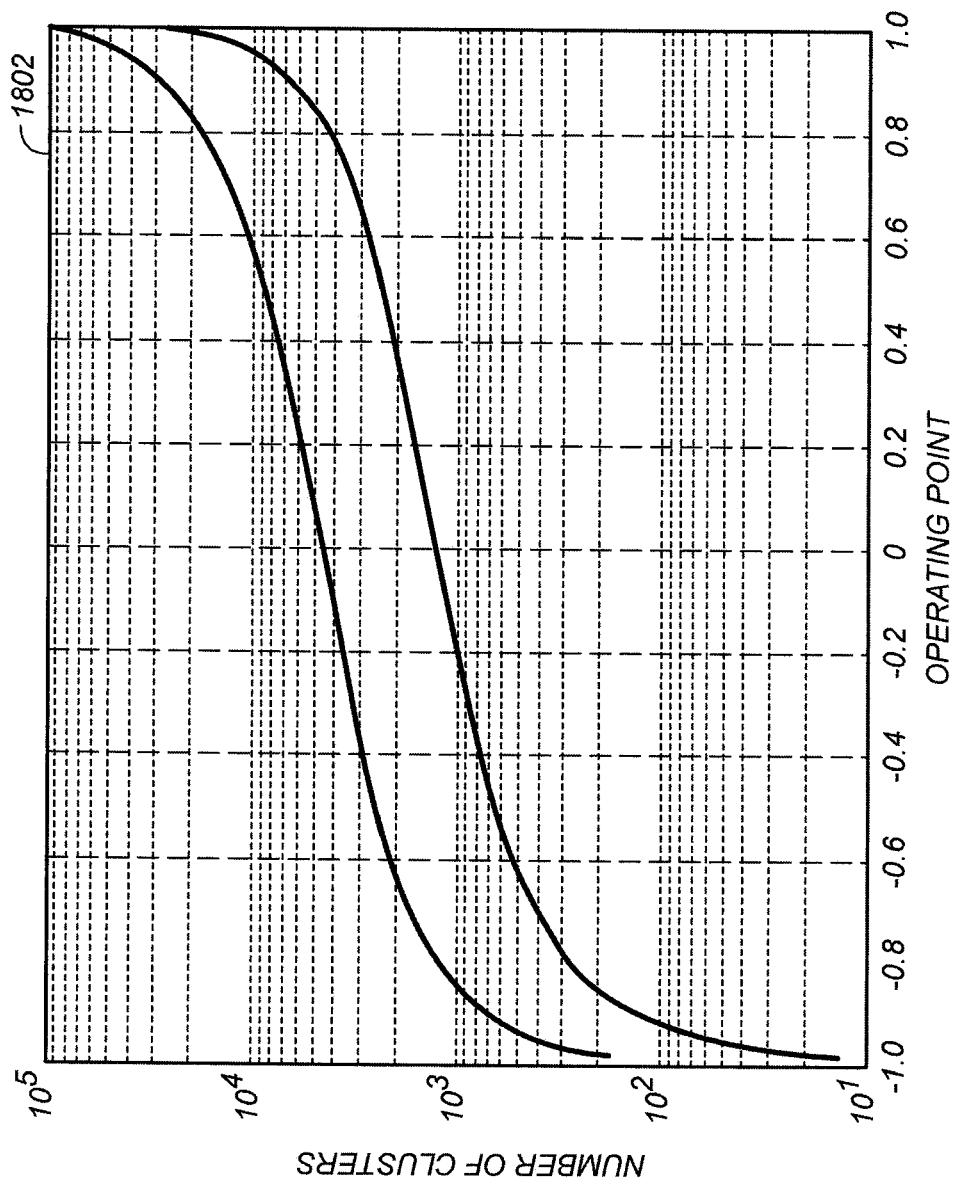
FIG. 18 is a graph illustrating an exemplary result of applying the algorithm of the present invention to a plurality of mammograms.

To demonstrate statistical significance of the FP reduction, the present algorithm has been applied to over 5000 normal mammographic images. The upper curve in graph 1802 in FIG. 18 reveals the total number of FP clusters before applying the present FP reduction algorithm at different operation points. The lower curve in graph 1802 in FIG. 18 shows the total number of clusters that are verified as associated with linear structures. These clusters will be tagged as normal.

As discussed previously with regard to FIGS. 1, 2A and 2B, the linear structure verifier in step 256 can be configured or reconfigured by commands from the human operator 168 through command path 174 that is connected to parameter selection step 158. Step 158 sends the selected parameters to step 160 through forward path 176. For example, the linear structure verifier can be configured so that a step of true positive protection is activated in the linear structure verification process. Exemplary functions contained in the step of true positive protection are rightHitChk(clst, gROI, $\xi_r$) and applyRingHitRules(clst, $\xi_r$) that have been described previously. The linear structure verifier can also be configured so that numerical thresholds can be varied. Exemplary numerical thresholds are those used for parameters $\delta_\theta$, $\phi_h$, $\Psi$ and $\Re$ in the cascade rule based verification algorithm.

Referring again to FIG. 1, the workflow 150 always starts off by loading up the constant parameter generator 154 with predefined exemplary values (as shown in earlier parts of this disclosure for the parameters listed in the previous paragraph) for $\delta_\theta$, $\phi_h$, $\Psi$ and $\Re$. Operator 168 commands the system to select the constant parameters through the steps of human intervention 162 and parameter selection 158. A feedback path 164 from the verification step 160 provides useful information to the human intervention step 162 (e.g., by displaying of an intermediate result) for seeking either staying on the current course or calling for a change of the operation. If the latter is true, the operator can halt the operation through human intervention step 162 and adjust corresponding parameters $\delta_\theta$, $\phi_h$, $\Psi$ and $\Re$ (this action is represented by the step of using the controllable parameter generator 152). Then operator 168 commands the system to select the controllable parameters through the steps of human intervention 152 and parameter selection 158.

The present invention comprises a method and a configurable linear structure verification system that provides a configurable linear structure verifier in mammography CAD system. The verifier parameters for the linear structure verifier are from a plurality of different parameter generating sources, at least one of which is controllable by human input. The present invention also comprises a methodology of MCC cluster driven linear structure verification for MCC false-positive reduction in mammography CAD system. Different from linear structure detection algorithms that are popular in image processing literature, the method of linear structure verification in the present invention requires no actual structural lines to be generated and no re-sampling of images. This results in searching for identifiable information in a target area that is a tiny fraction of a size already limited region of interest. This cluster driven linear structure verification methodology also employs an efficient cascade rule based algorithm that is mostly in linear operation (ensemble averaging). The efficiency and efficacy of the proposed method are demonstrated with the results obtained by applying the LS verification method to over one thousand normal cases.

Figure 5:
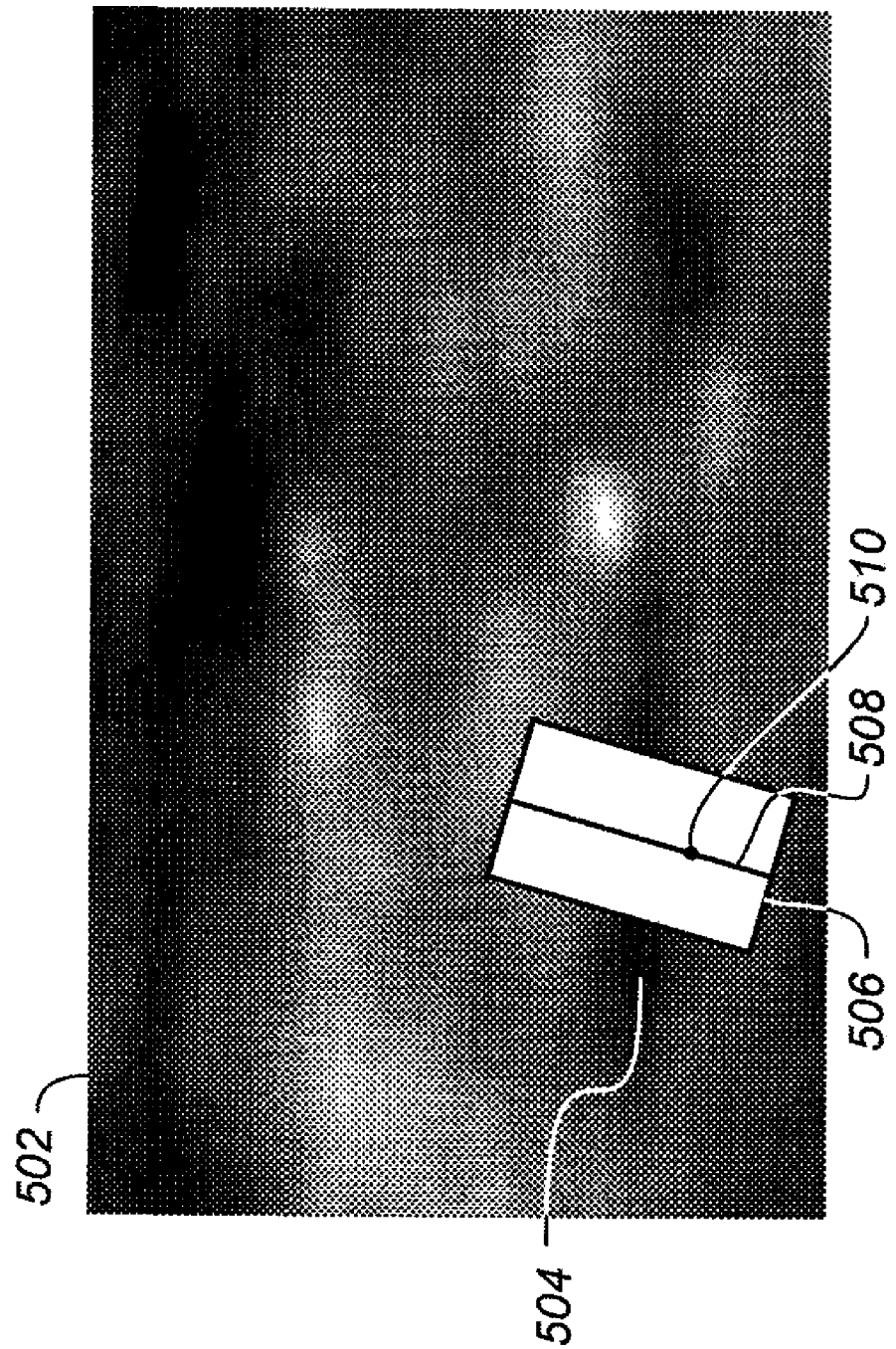
FIG. 5 shows an enlarged region of interest of a mammogram and illustrates a design to compute an eigenvalue band integral profile for an object in the mammogram according to an embodiment of the invention.

In general, algorithms such as the one in the present invention do not distinguish between concave and convex objects in images. The linear structures to be verified in mammograms usually appear brighter than other background contents. An exemplary ROI 502 is shown in FIG. 5 where an object 504 appears that is not a type of linear structure presently sought. To rule out this type of false line structure, the present invention provides a method of verifying convexity and concavity of detected linear structures. A preferred scheme for verifying convexity and concavity of verified linear structures is an eigenvalue band integral profiling in the present invention.

Figure 6B:
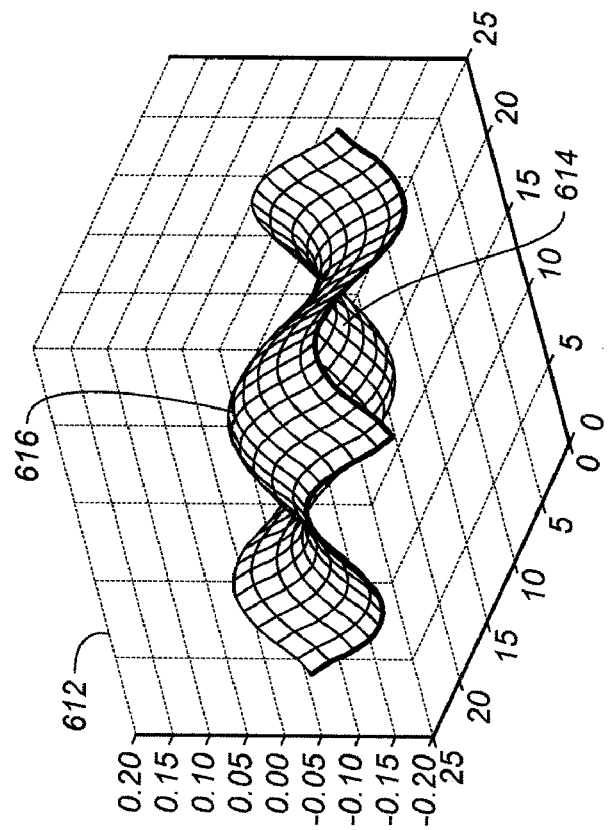
FIGS. 6A and 6B are illustrations respectively of an image that has convex and concave surface parts and an image of corresponding eigenvalues.
Figure 6A:
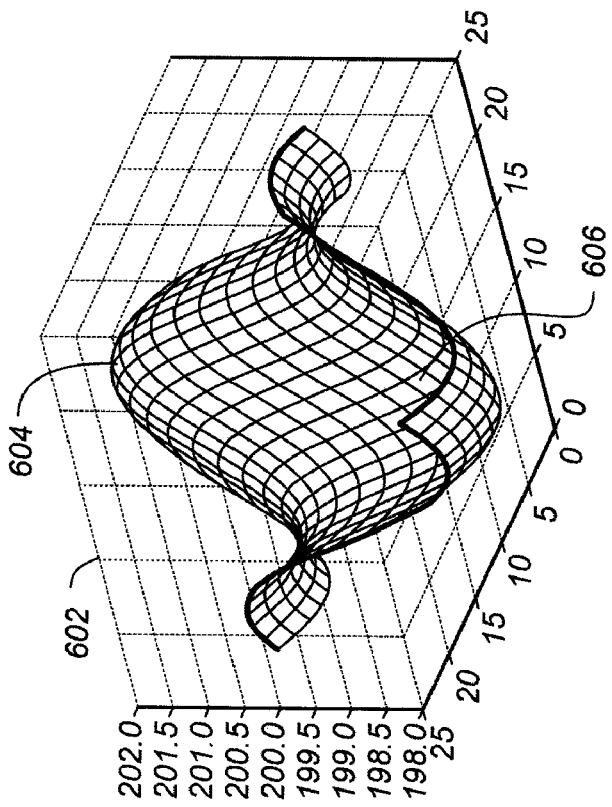

Graph 602 in FIG. 6A shows a convex surface 604 and a concave surface 606 illustrating intensity profiles for an arbitrarily defined image. Graph 612 of FIG. 6B shows the corresponding eigenvalue profiles of graph 602. Note that a convex surface 604 has negative eigenvalues 614 and the concave surface 606 has positive eigenvalues 616. The steps of computing eigenvalues of a surface are described below.

Referring again to FIG. 5, denote ROI 502 by image I. Define a band 506 that covers part of the object (surface) 504. Denote a band line 508 in band 506 by $l_k$. Denote the position of a pixel 510 on line 508 within band 506 by $p_{l_k,i}$. Denote the code value (intensity) of pixel 510 by $I(p_{l_k,i})$. Construct a Hessian matrix $H=\{h_{m,n}\}$ for each of the pixels within the band 506 with the formula $$H(I(p_{l_k,i})) = \{h_{m,n}\}; h_{m,n} = \frac{\partial I}{\partial x_m \partial x_n}; m \in [1, 2]; n \in [1, 2].$$

Where $x_m$ and $x_n$ signify two orthogonal axes of image I, and element $h_{m,n}$ is a partial derivative. Solve the following matrix equation to obtain eigenvalues $\lambda_1$ and $\lambda_2$ for every pixel $p_{l_k,i}$ within band 506:

$$H = E\Lambda E^{-1}; E = [e_1, e_2]; \Lambda = \begin{bmatrix} \lambda_1 & 0 \\ 0 & \lambda_2 \end{bmatrix},$$

where $e_1$ and $e_2$ are 2 by 1 column vectors (eigen vectors). The sign of the eigenvalues indicates the surface orientation, either concave or convex. In the present invention, to evaluate the surface orientation, a metric, S, is defined as eigenvalue band integral profile to verify object surface property (convexity and concavity). The element of the eigenvalue band integral profile, S, is computed as $$s_i = \sum_{k=1}^{W} \tilde{I}(p_{l_k,i}), \text{ where } \tilde{I} = \{\lambda_1(p_{l_k,i}) + \lambda_1(p_{l_k,i})\}$$

and W is the number of lines within the band. FIG. 7A shows an actual ROI 702 of a digitized mammogram. A band 704 covers part of an object in ROI 702. Graph 706 of FIG. 7B displays the actual eigenvalue band integral profile for the pixels within band 704. The positive curve of the eigenvalue band integral profile indicates that the object covered by band 704 in ROI 702 has concave type surface in terms of its intensity values. Persons skilled in the art will understand that metrics other than eigenvalue band integral profile that is devised in the present invention, such as, intensity profiles, could be employed for the purpose of verifying image object surface convexity and concavity.

The present invention is described as a method. However, in another preferred embodiment, the present invention comprises a computer program product for image linear structure verification in medical applications in accordance with the method described. In describing the present invention, it should be apparent that the computer program of the present invention can be utilized by any well-known computer system, such as the personal computer. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It will be appreciated that variations and modifications can be effected by a person of ordinary skill in the art without departing from the scope of the invention. The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

The invention has been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List 150 workflow chart
152 controllable parameter generator
154 constant parameter generator
156 input for mammographic images
158 step of parameter selection
160 step of linear structure verification
162 step of human intervention
164 feedback path
168 human operator or user
174 command path
176 forward path
252 algorithm step for preprocessing images
256 algorithm step for linear structure verification
258 algorithm step for MCC classification
260 algorithm step for post processing
301 workflow chart
302 algorithm step for locating candidate clusters
304 algorithm step for defining rotatable bands
306 algorithm step for generating and evaluating features
308 algorithm step for tagging candidate MCC clusters
310 algorithm stem for assessing correctness of tags
402 mammogram
404 region of interest (ROI)
502 graph (region of interest)
504 object
506 a band
508 a band line
510 a band pixel
602 graph (surfaces)
604 convex surface
606 concave surface
612 graph (eigenvalues)
614 negative eigenvalues
616 positive eigenvalues
702 graph (region of interest)
704 a band
706 eigenvalue band integral profile
802 algorithm step of locating candidate spots
804 algorithm step of forming MCC candidate clusters
806 algorithm step of ranking candidate clusters
808 algorithm step of verifying linear structures
810 algorithm step of verifying linear structures near candidate clusters
902 region of interest
904 region of interest
1002 a graph of a band and a linear structure
1004 a graph of a band and a linear structure
1102 a region of interest
1104 a graph
1202 a region of interest with a band
1302 a graph
1304 a graph
1402 a graph
1502 a graph
1504 a graph
1506 a graph
1508 a graph
1602 a graph
1702 mammograms
1802 a graph

The invention claimed is:

1. A A method for verification of microcalcification candidate cluster driven linear structure in mammographic images, comprising:
locating a plurality of microcalcification candidate clusters in digital mammographic images;
using positions of candidate spots of the microcalcification candidate cluster to define rotatable bands that enclose all or part of the candidate spots in the mammographic images, extracting the rotatable bands in the mammographic images;
processing the rotatable bands to generate identifiable features and evaluating the features;
attaching a tag to each cluster based on results of the evaluating;
further analyzing the rotatable bands; and
removing any tag that is attached incorrectly.

2. A method for verification of image linear structure in medical imaging applications, comprising:
selecting, from a plurality of different parameter generating sources, parameters for a linear structure verifier in a medical imaging system;
configuring the linear structure verifier according to the parameters; and
verifying, using the linear structure verifier, linear structure associated with a microcalcification candidate cluster in a medical image, wherein the linear structure verifier utilizes cascade rules to verify the linear structure associated with the microcalcification candidate cluster.

3. The method as in claim 2, wherein at least one of the parameter generating sources is controllable by human input.

4. The method as in claim 2, wherein the linear structure verifier can be used before classifying the microcalcification candidate cluster.

5. The method as in claim 2, wherein the linear structure verifier can be configured to have various functional combinations.

6. The method as in claim 2, wherein the medical imaging system is a mammography computer-aided detection system.

7. The method as in claim 6, further comprising analyzing mammography images from the mammography computer-aided detection system to form microcalcification clusters; and classifying the microcalcification clusters into malignant and benign types, the classifying being accomplished either before or after the verifying.

8. The method as in claim 2, wherein the linear structure verifier can be configured to realize different operational points.

9. The method as in claim 2, wherein the linear structure verifier can be used after classifying the microcalcification candidate cluster.

10. A method for verification of microcalcification candidate cluster driven linear structure in mammographic images, comprising:
locating a plurality of microcalcification candidate clusters in at least one digital mammographic image;
extracting rotatable bands in the at least one mammographic image;
processing the rotatable bands to generate identifiable features and evaluating the features;
attaching a tag to each cluster in the plurality of microcalcification candidate clusters based on results of the evaluating;
further analyzing the rotatable bands; and
removing any tag that is attached incorrectly based on the further analysis.

11. The method as in claim 10, further comprising steps of:
applying a plurality of image processing and computer vision procedures that find connected pixels that present characteristics which are similar to those of microcalcifications in the at least one digital mammographic image;
grouping the connected pixels into microcalcification candidate spots;
grouping a plurality of microcalcification candidate spots that are close to each other within a certain distance into a cluster; and
attaching relevant parameters to the cluster.

12. The method as in claim 10, further comprising the steps of;
applying image processing and computer vision algorithms to image pixels within the rotatable bands;
extracting information related to linear structures from the processed image pixels; and
applying cascade rules to extracted information to confirm the presence of the linear structures.

13. The method as in claim 10, wherein the attached tag indicates that the cluster is associated with linear structures.

14. The method as in claim 10, further comprising the steps of:
applying image analysis algorithms to pixels in the rotatable bands for clusters that are evaluated as being associated with linear structures; and
removing the attached tag if the analysis results are satisfied.

15. The method as in claim 14 wherein the analysis results satisfy topological requirements.

16. The method as in claim 10, wherein locating a cluster in the plurality of microcalcification candidate clusters includes a step of transforming an intensity region of interest into a gradient magnitude region of interest.

17. The method of claim 16, further comprising a step of transforming the rotatable bands of a gradient magnitude region of interest into a discretized curve in Hough parameter space; and analyzing the gradient magnitude region of interest to detect candidate spots.

18. The method as in claim 10, wherein the identified features of the rotatable bands include a maximum relative magnitude of ensemble average curves of a set of lines in the rotatable bands;
and an ensemble average ratio of maximum to minimum average curves in the rotatable bands.

19. The method of claim 18, wherein analyzing the gradient magnitude region includes a step of detecting ring structure around a spot.

* * * * *

UNITED STATES PATENT AND TRADEMARK OFFICE
CERTIFICATE OF CORRECTION

PATENT NO. : 8,203,338 B2
APPLICATION NO. : 12/058803
DATED : June 19, 2012
INVENTOR(S) : Shoupu Chen et al.

It is certified that error appears in the above-identified patent and that said Letters Patent is hereby corrected as shown below:

| | |
|---|---|
| Column 11, line 37 | Please replace "ROi" with --ROI-- |
| Column 11, line 38 | Please replace "ROi" with --ROI-- |
| Column 11, line 43 | Please replace "ROi" with --ROI-- |

Signed and Sealed this
Second Day of April, 2013

Teresa Stanek Rea
*Acting Director of the United States Patent and Trademark Office*